(12) United States Patent
Lee et al.

(10) Patent No.: US 10,045,181 B2
(45) Date of Patent: Aug. 7, 2018

(54) METHOD AND APPARATUS FOR BLUETOOTH CONNECTION

(71) Applicant: LG ELECTRONICS INC., Seoul (KR)

(72) Inventors: Jaeho Lee, Seoul (KR); Hyeonjae Lee, Seoul (KR); Minsoo Lee, Seoul (KR); Jangwoong Park, Seoul (KR); Seungryul Yang, Seoul (KR); Younghwan Kwon, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/036,038

(22) PCT Filed: Nov. 11, 2014

(86) PCT No.: PCT/KR2014/010820
§ 371 (c)(1),
(2) Date: May 11, 2016

(87) PCT Pub. No.: WO2015/069093
PCT Pub. Date: May 14, 2015

(65) Prior Publication Data
US 2016/0286341 A1 Sep. 29, 2016

Related U.S. Application Data

(60) Provisional application No. 61/902,737, filed on Nov. 11, 2013, provisional application No. 61/944,072, (Continued)

(51) Int. Cl.
*H04W 76/25* (2018.01)
*H04W 4/80* (2018.01)
(Continued)

(52) U.S. Cl.
CPC ............ *H04W 4/80* (2018.02); *H04W 4/008* (2013.01); *H04W 76/023* (2013.01);
(Continued)

(58) Field of Classification Search
CPC .................................................. H04W 76/25
See application file for complete search history.

(56) References Cited

U.S. PATENT DOCUMENTS

| 9,494,673 | B2* | 11/2016 | Kainulainen | ......... G01S 5/0009 |
| 2001/0026539 | A1* | 10/2001 | Kornprobst | ............ H04L 47/14 |
| | | | | 370/329 |

(Continued)

FOREIGN PATENT DOCUMENTS

| KR | 10-2007-0098127 | 10/2007 |
| KR | 10-2008-0020572 | 3/2008 |

(Continued)

OTHER PUBLICATIONS

PCT International Application No. PCT/KR2014/010820, Notification of Transmittal of the International Search Report dated Feb. 26, 2015, 4 pages.

*Primary Examiner* — Cindy Trandai
(74) *Attorney, Agent, or Firm* — Lee, Hong, Degerman, Kang & Waimey

(57) ABSTRACT

The present invention relates to a method and device for performing a Bluetooth reconnection procedure. In accordance with embodiments of the present invention, there are provided a method and device, including sending a first message notifying a second device of the activation of a first device to the second device through a specific channel, receiving a beacon message through the specific channel from the second device as a response to the first message, sending a request message requesting a connection with the second device using Bluetooth to the second device through the specific channel, and receiving a confirm message (Continued)

through the specific channel from the second device as a response to the request message. The first device stores information related to the Bluetooth connection with the second device.

12 Claims, 28 Drawing Sheets

Related U.S. Application Data filed on Feb. 25, 2014, provisional application No. 62/004,908, filed on May 30, 2014.

(51) Int. Cl.
*H04W 76/14* (2018.01)
*H04W 76/02* (2009.01)
*H04W 4/00* (2018.01)
*H04W 76/04* (2009.01)

(52) U.S. Cl.
CPC ......... *H04W 76/045* (2013.01); *H04W 76/14* (2018.02); *H04W 76/25* (2018.02)

(56) References Cited

U.S. PATENT DOCUMENTS

| | | | |
|---|---|---|---|
| 2004/0038645 A1 | 2/2004 | Rcunamaki et al. | |
| 2004/0114737 A1* | 6/2004 | MacConnell | H04L 12/12 379/106.03 |
| 2005/0088980 A1* | 4/2005 | Olkkonen | H04W 48/16 370/255 |
| 2006/0039450 A1* | 2/2006 | Fulton | H04B 1/7156 375/133 |
| 2007/0249323 A1* | 10/2007 | Lee | G06F 21/33 455/411 |
| 2007/0260905 A1* | 11/2007 | Marsden | G06F 1/3215 713/323 |
| 2009/0082072 A1* | 3/2009 | Ulupinar | H04W 52/0216 455/574 |
| 2009/0296670 A1* | 12/2009 | Luo | H04L 47/10 370/338 |
| 2011/0299423 A1* | 12/2011 | Shim | H04L 47/24 370/254 |
| 2012/0052802 A1* | 3/2012 | Kasslin | H04W 48/12 455/41.2 |
| 2012/0196534 A1* | 8/2012 | Kasslin | H04W 4/06 455/41.2 |
| 2013/0109323 A1* | 5/2013 | Ruutu | H04B 5/0031 455/68 |
| 2014/0173439 A1* | 6/2014 | Gutierrez | G08B 21/24 715/727 |
| 2014/0173686 A1* | 6/2014 | Kgil | H04L 63/205 726/1 |
| 2014/0373123 A1* | 12/2014 | Kang | H04L 41/22 726/7 |
| 2015/0090786 A1* | 4/2015 | Surkau | G06K 7/10425 235/384 |

FOREIGN PATENT DOCUMENTS

| | | |
|---|---|---|
| KR | 10-2008-0088886 | 10/2008 |
| KR | 10-2010-0070875 | 6/2010 |

* cited by examiner

[FIG 1]
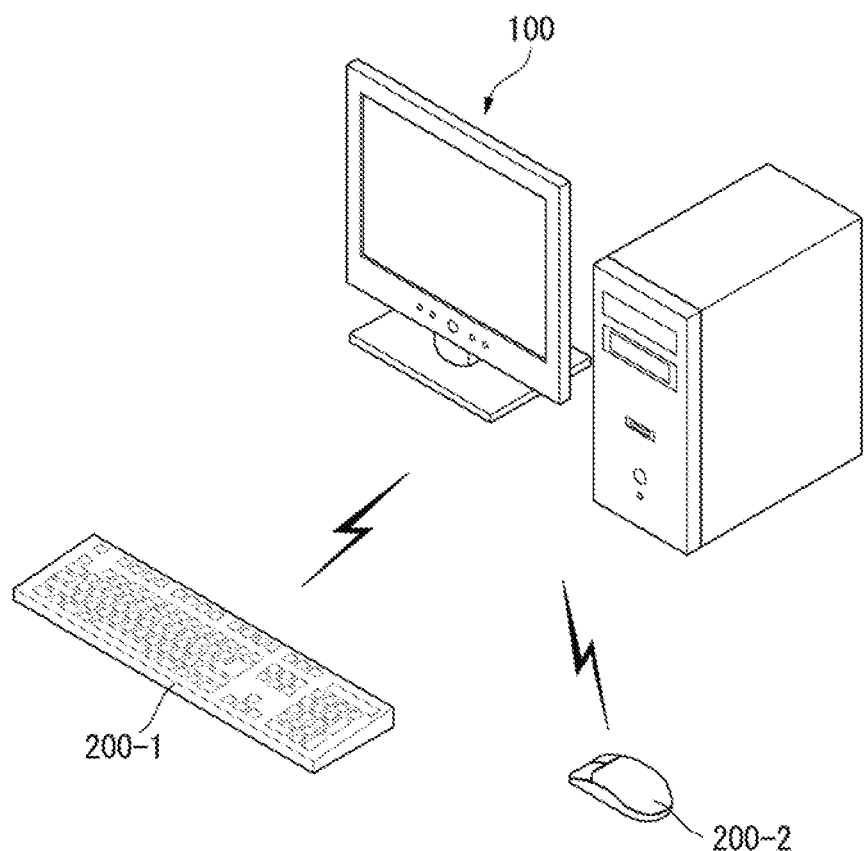

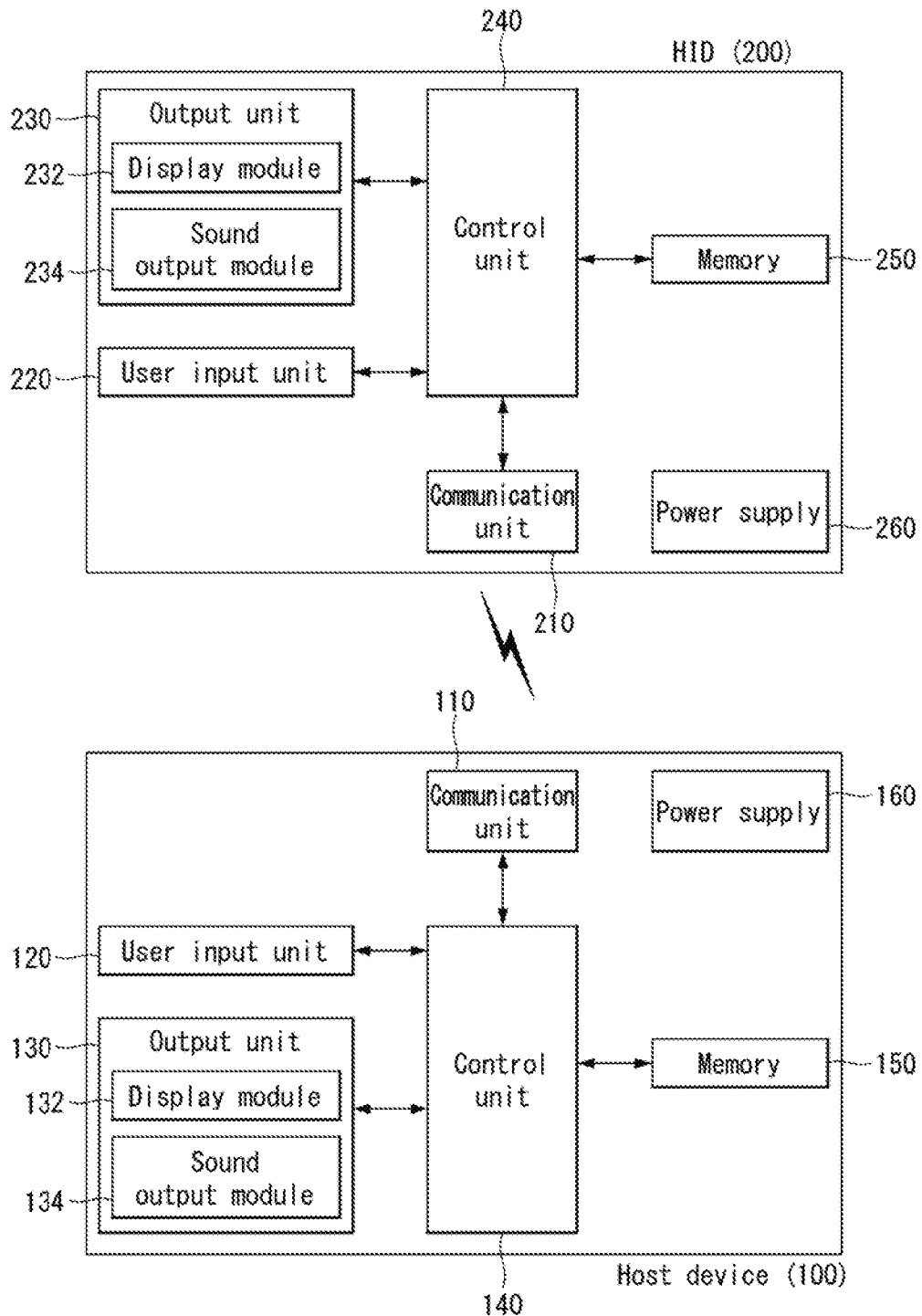
[FIG 2]

[FIG 3]
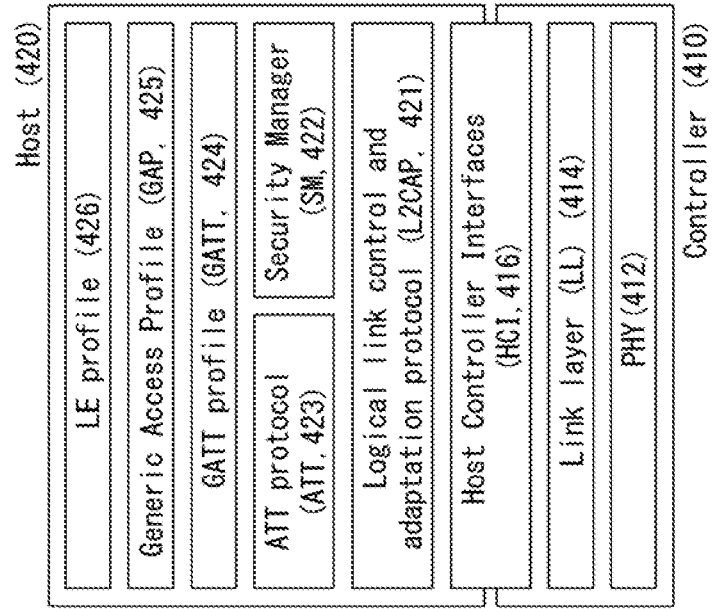
(a) BR/EDR Protocol Stack
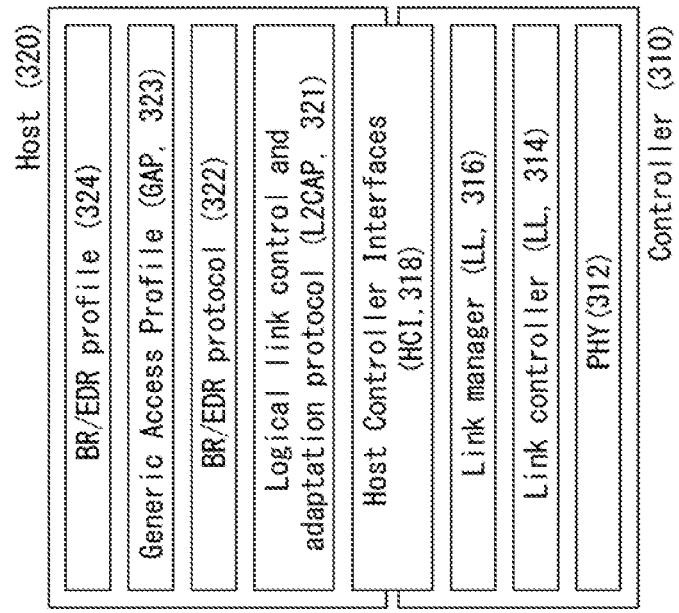
(b) LE Protocol Stack

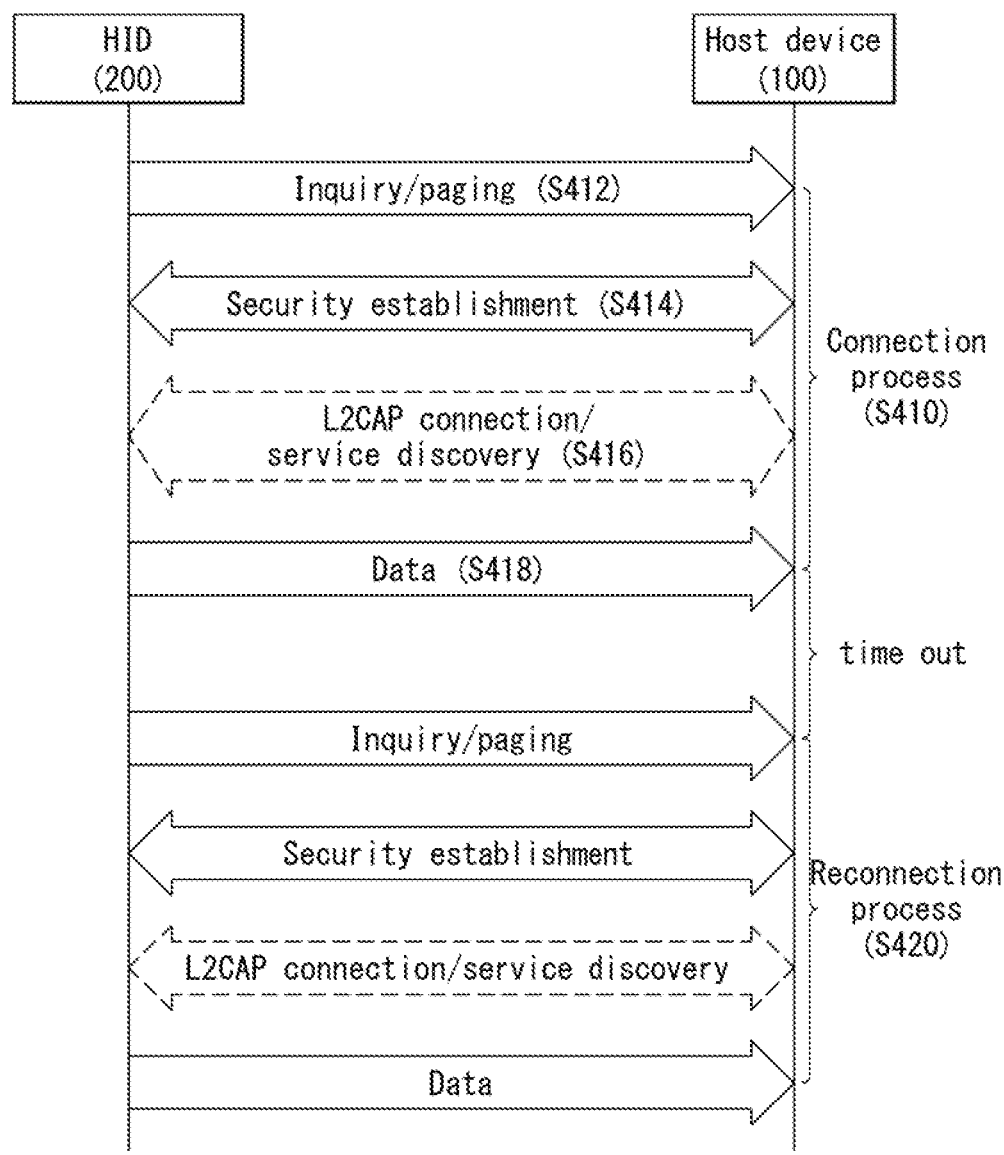

(a) Existing Bluetooth process    (b) New Bluetooth process

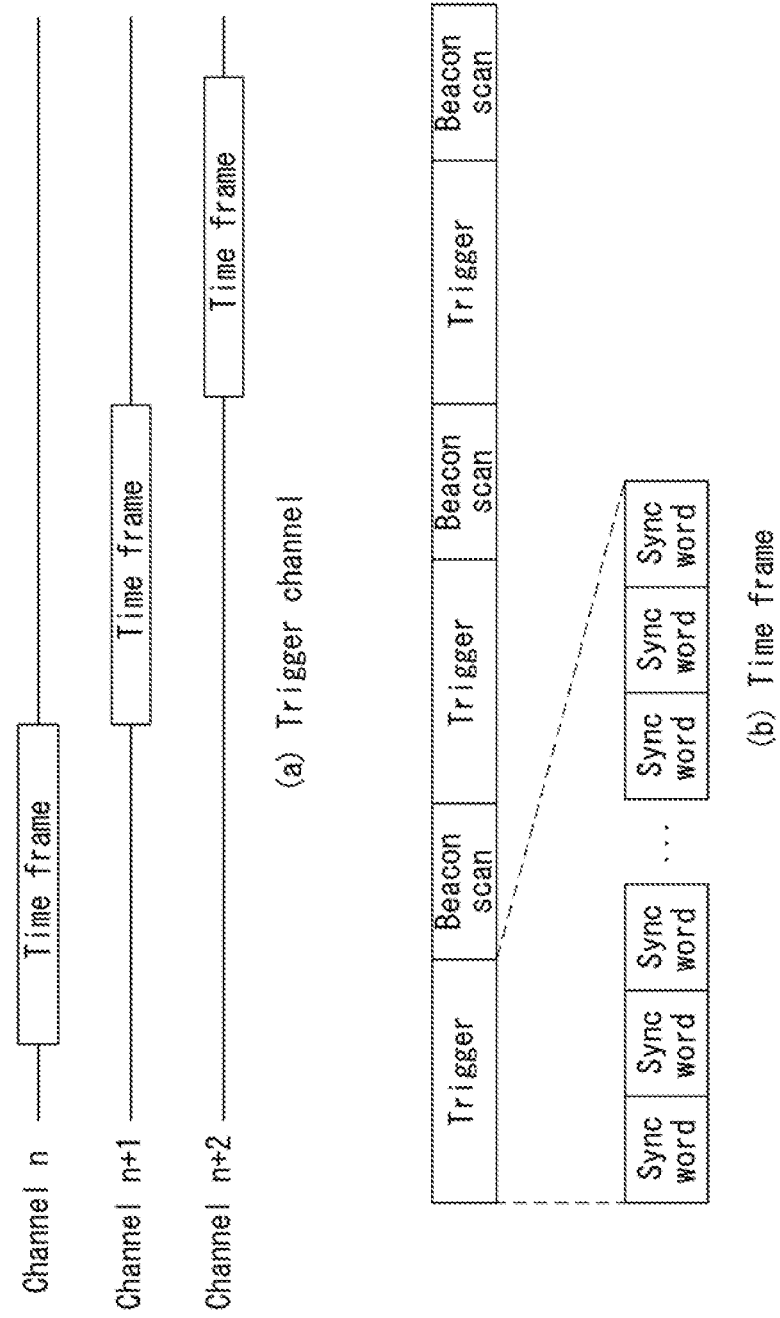

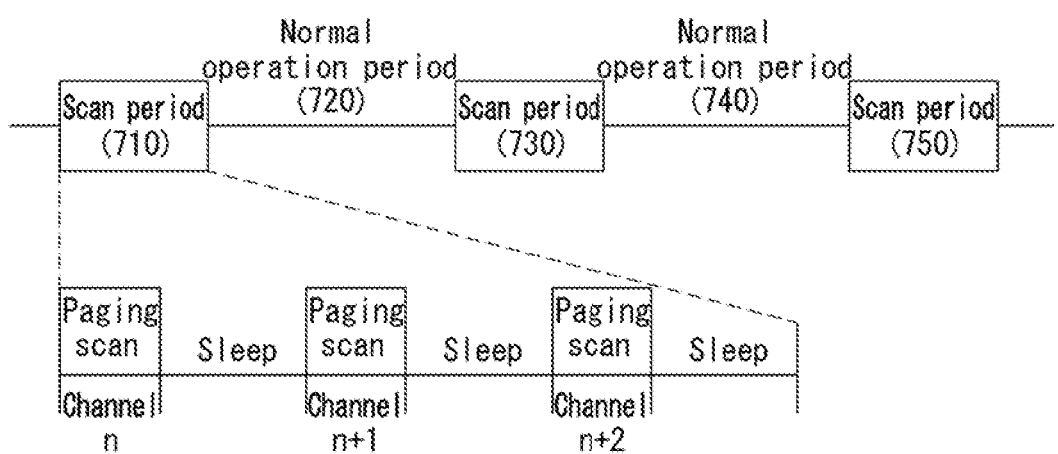

[FIG 8]
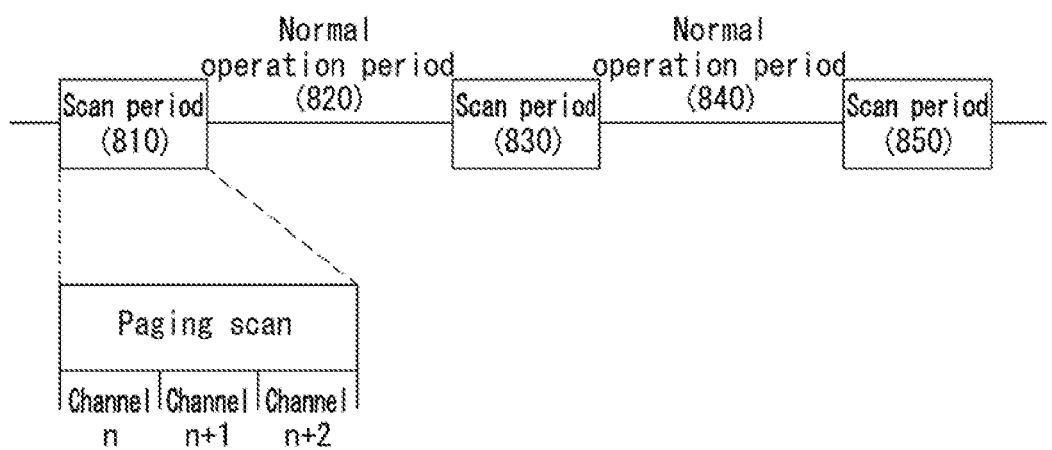

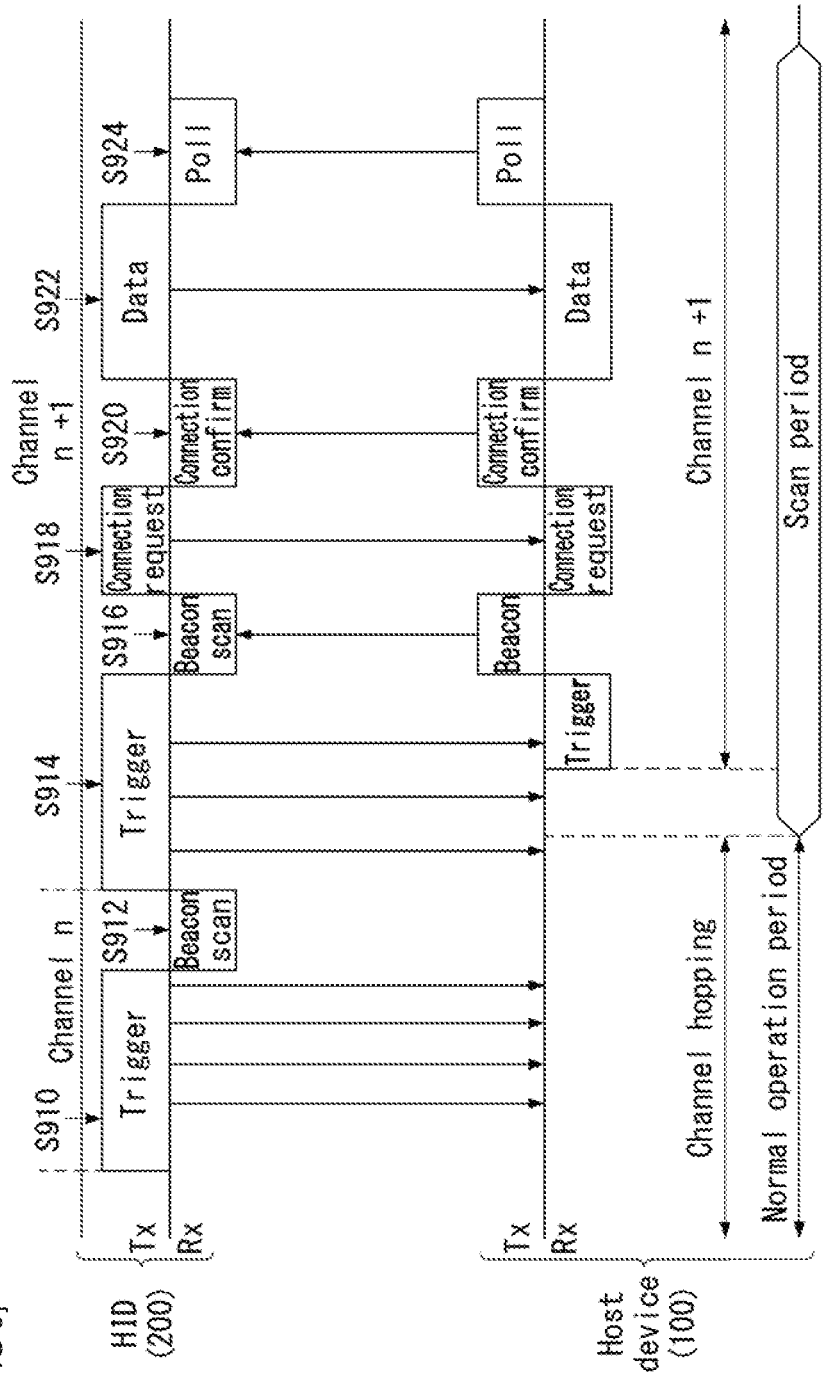

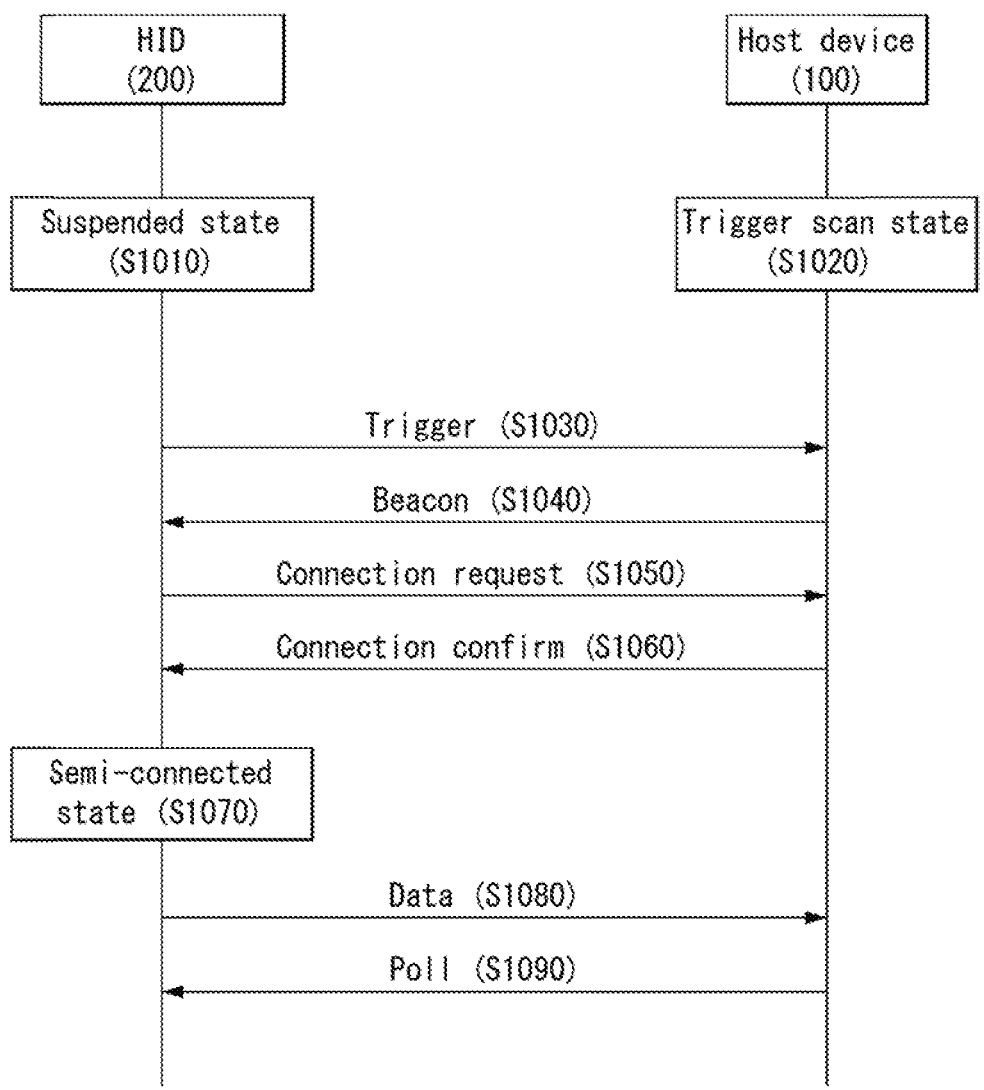

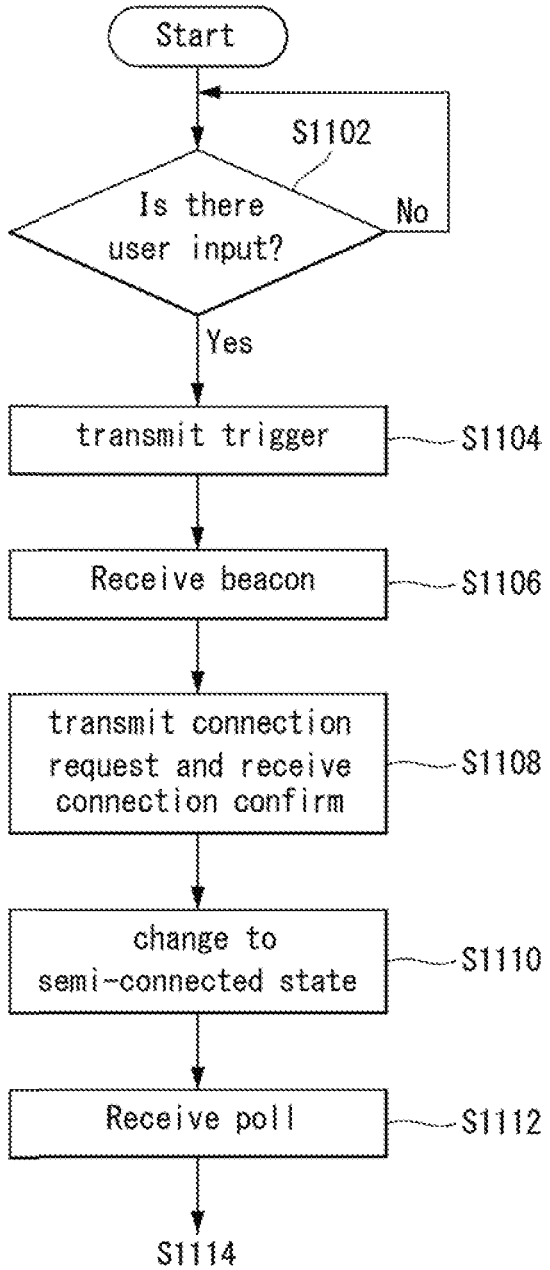
[FIG 11a]

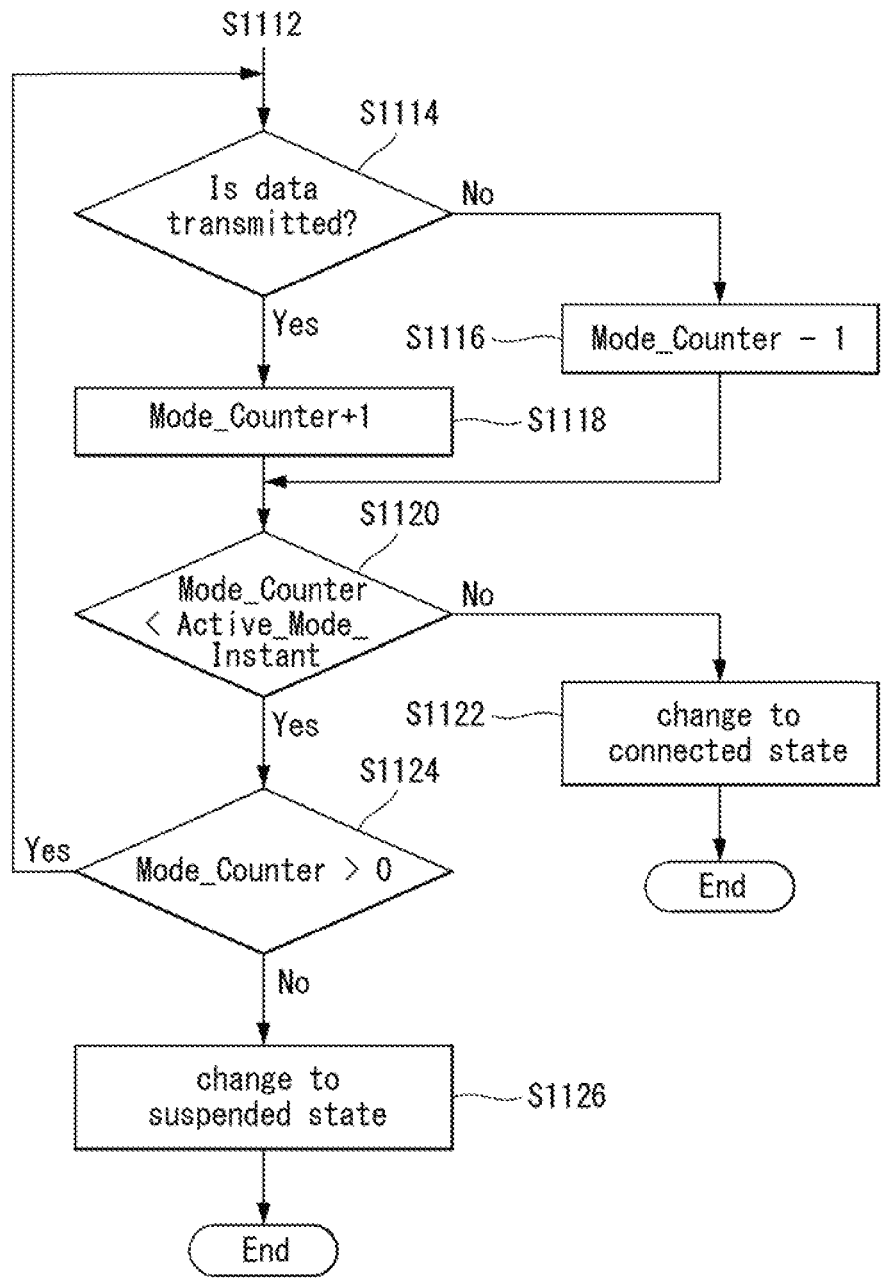

[FIG 12]
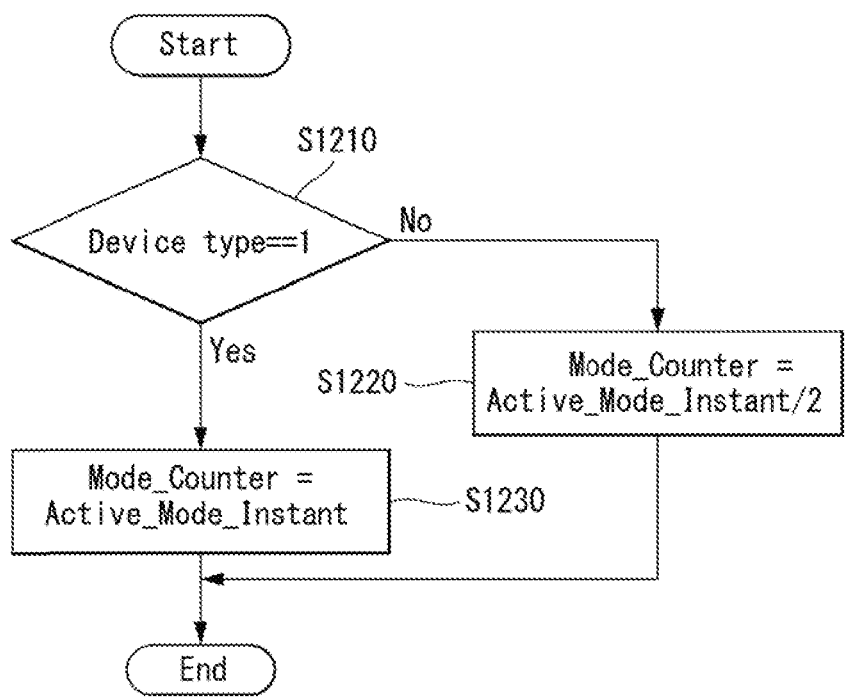

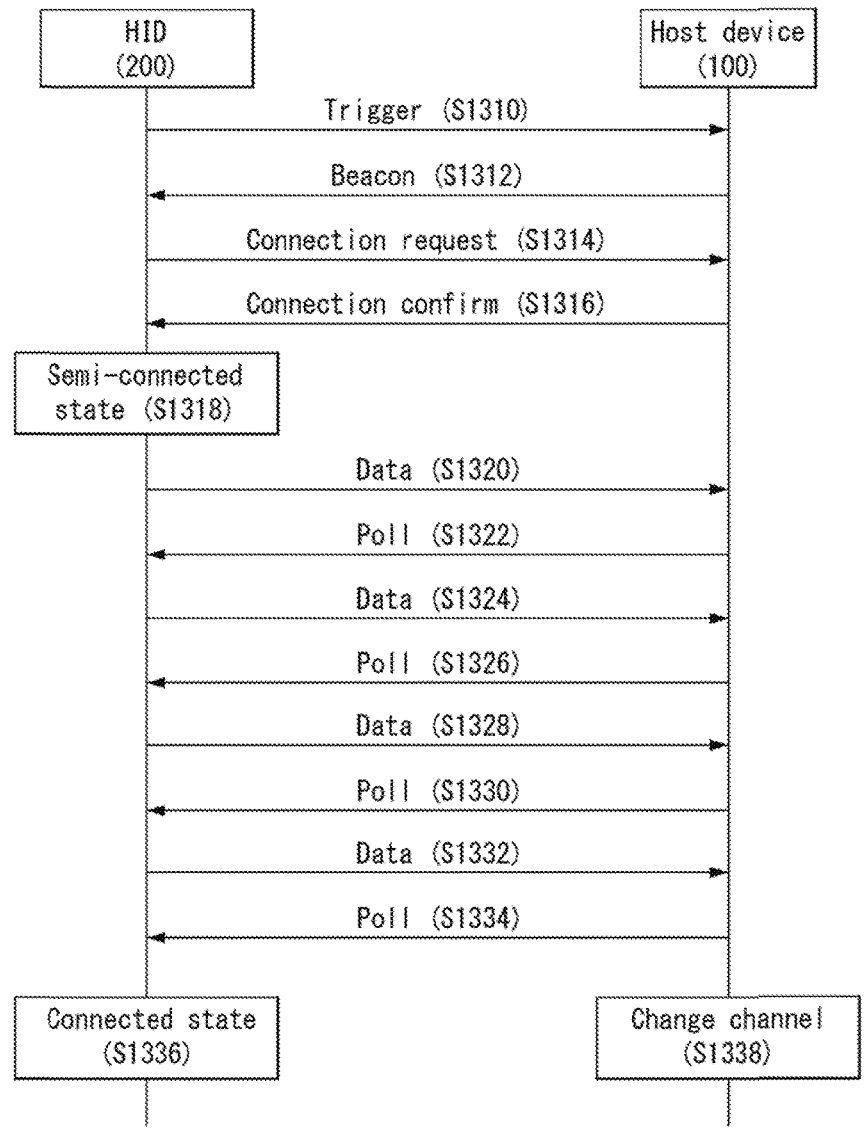

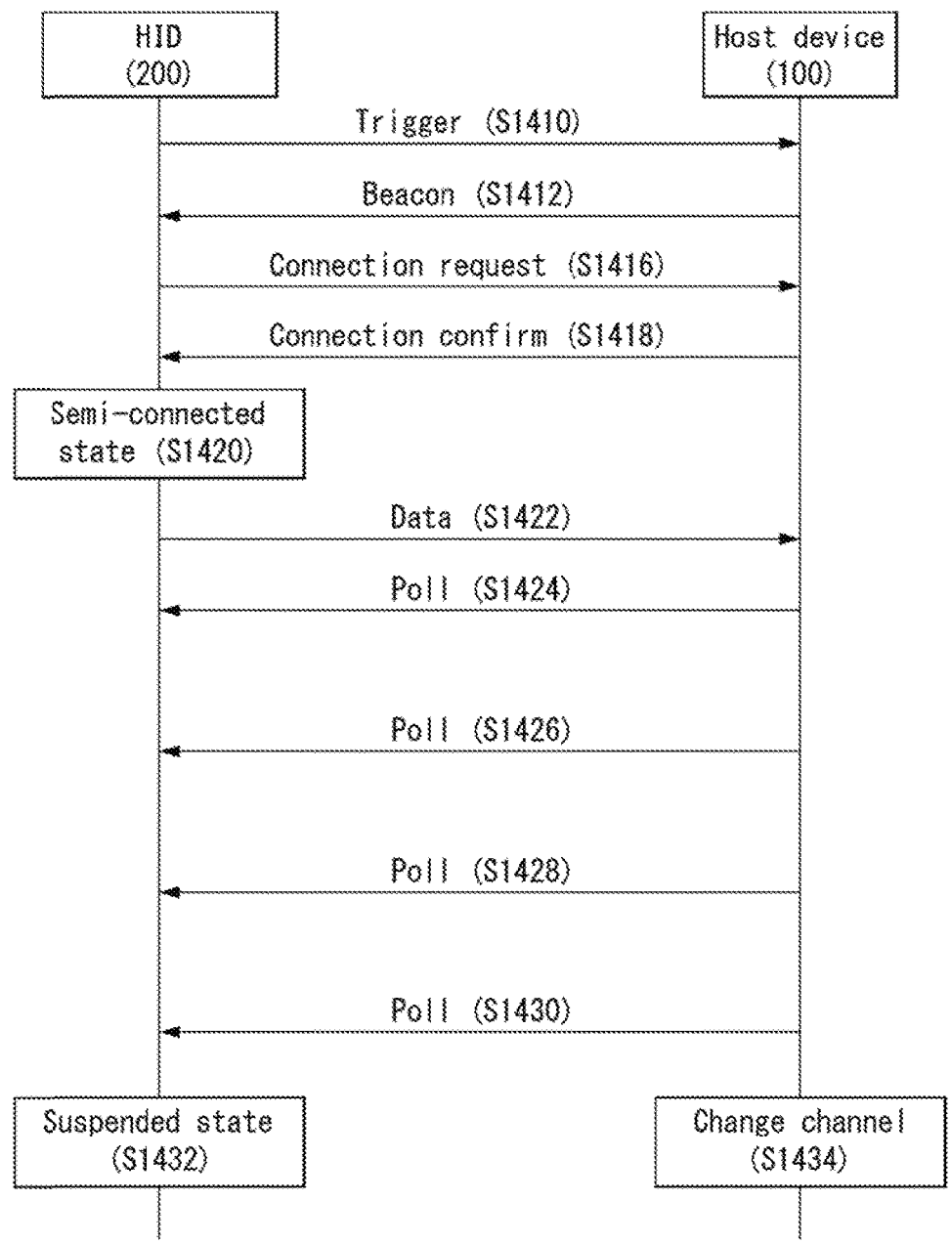
[FIG 14]

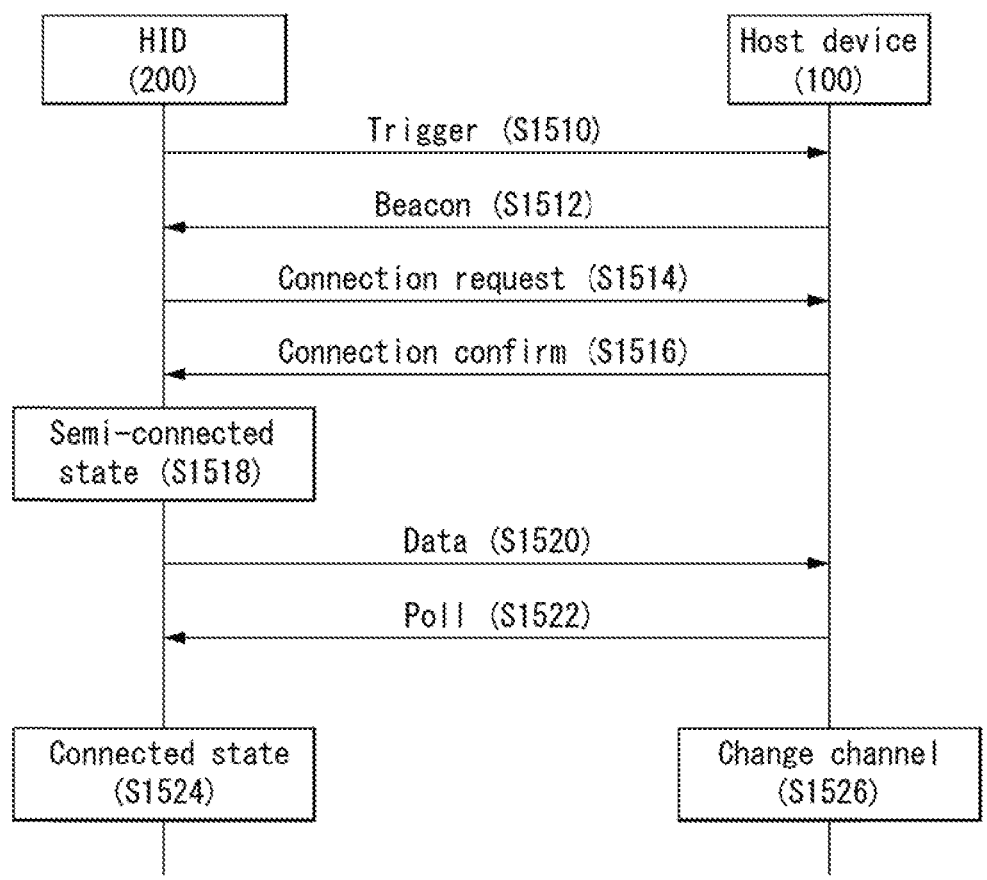

[FIG 16]
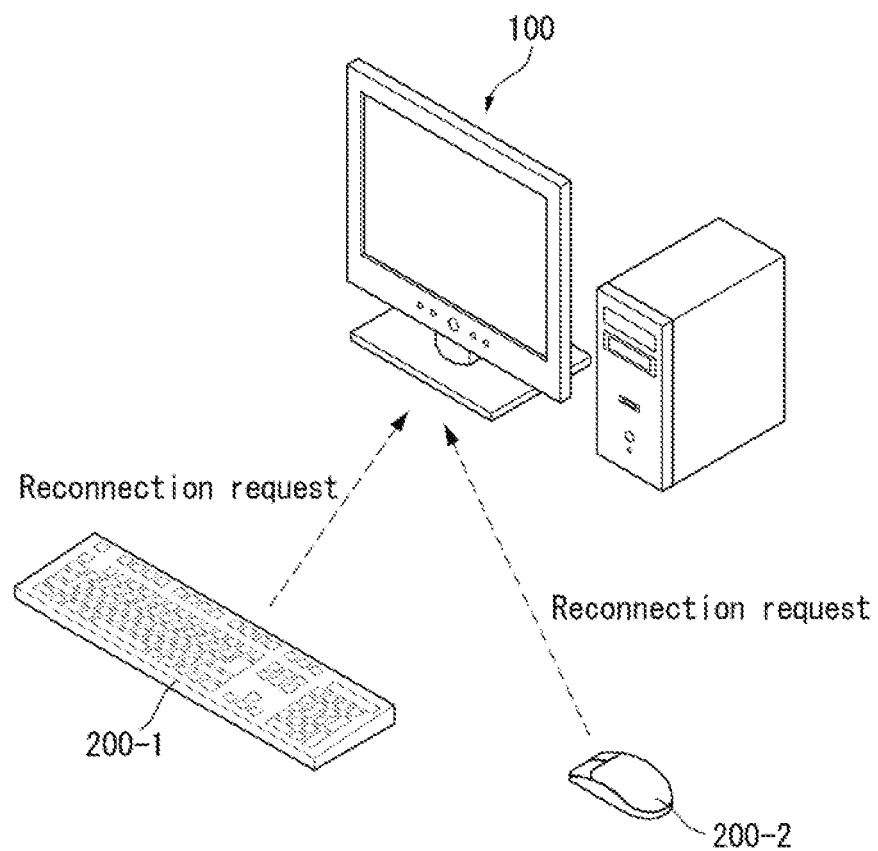

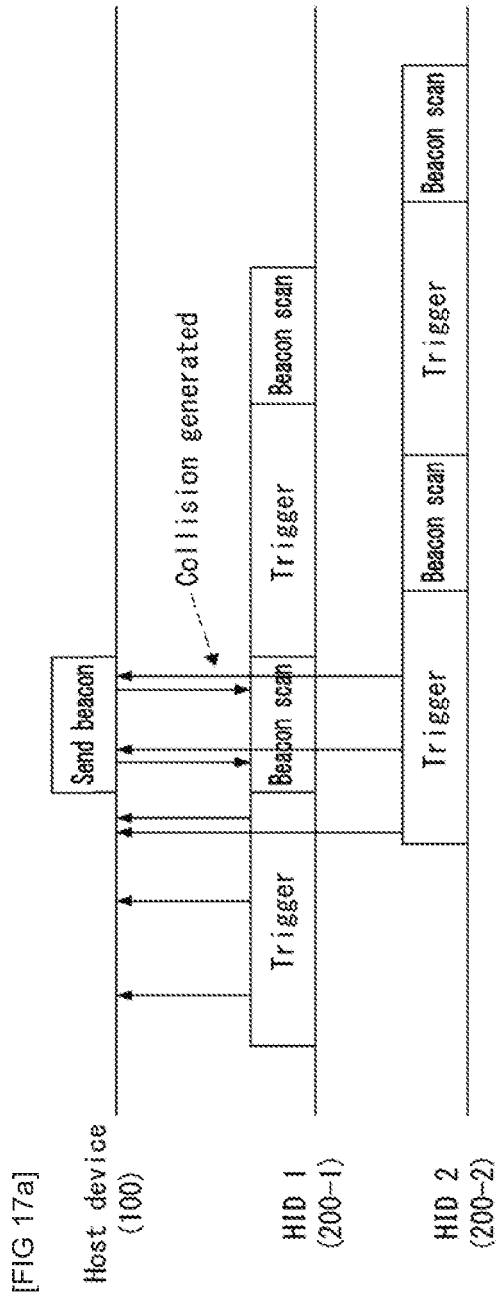

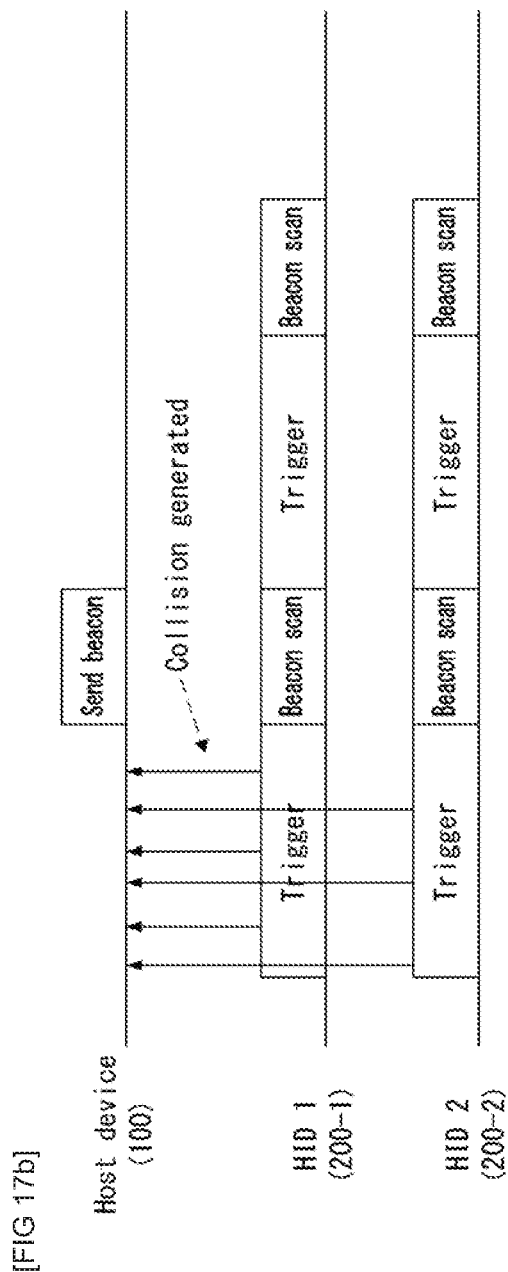

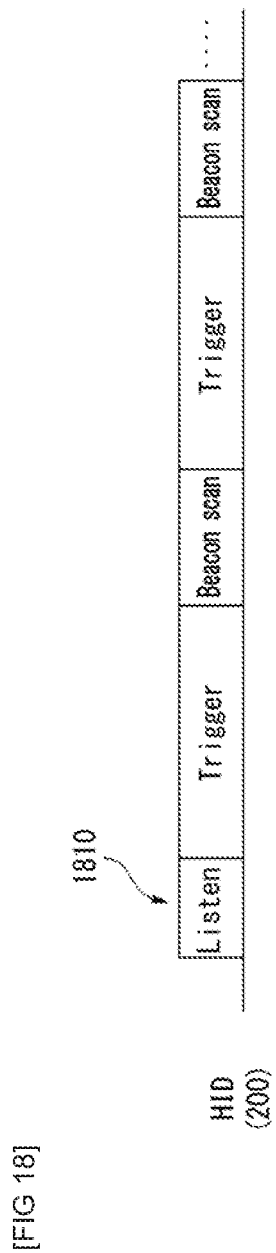
[FIG 18]

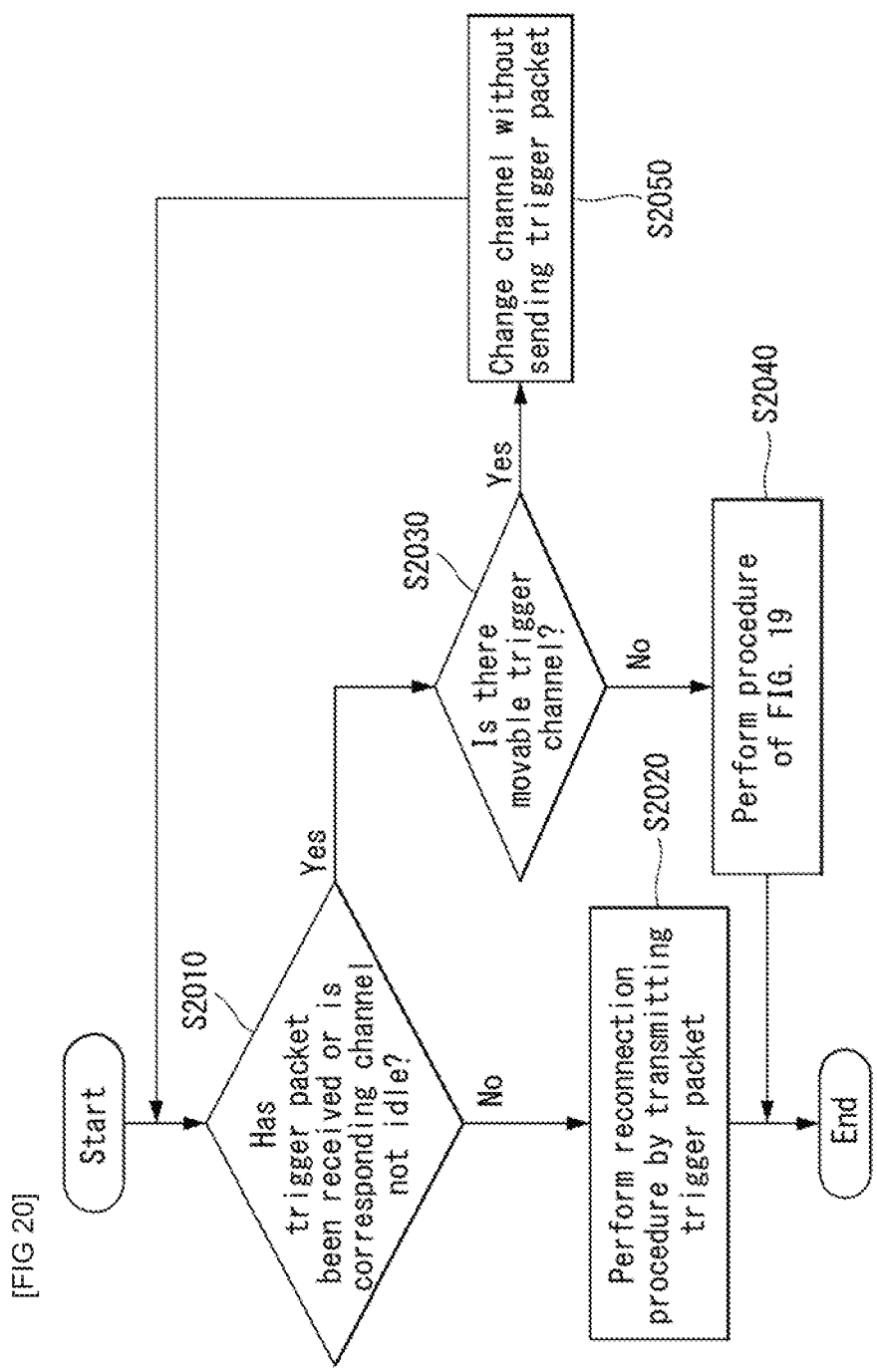
[FIG 20]

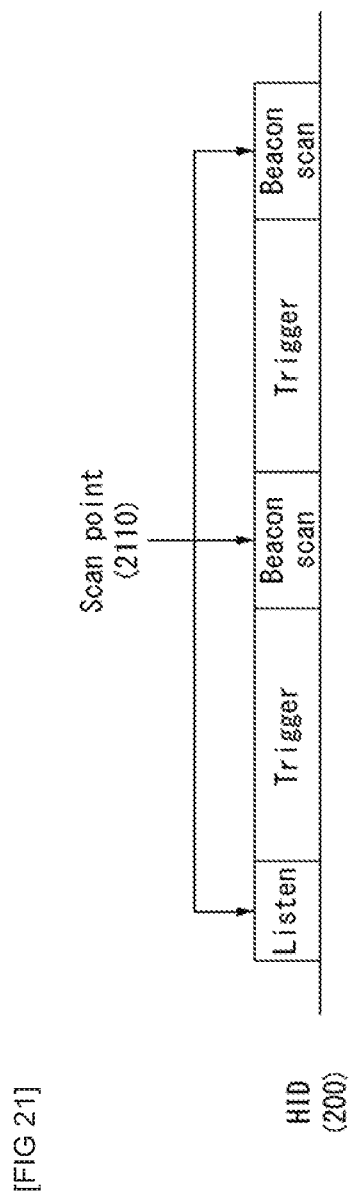
[FIG 21]

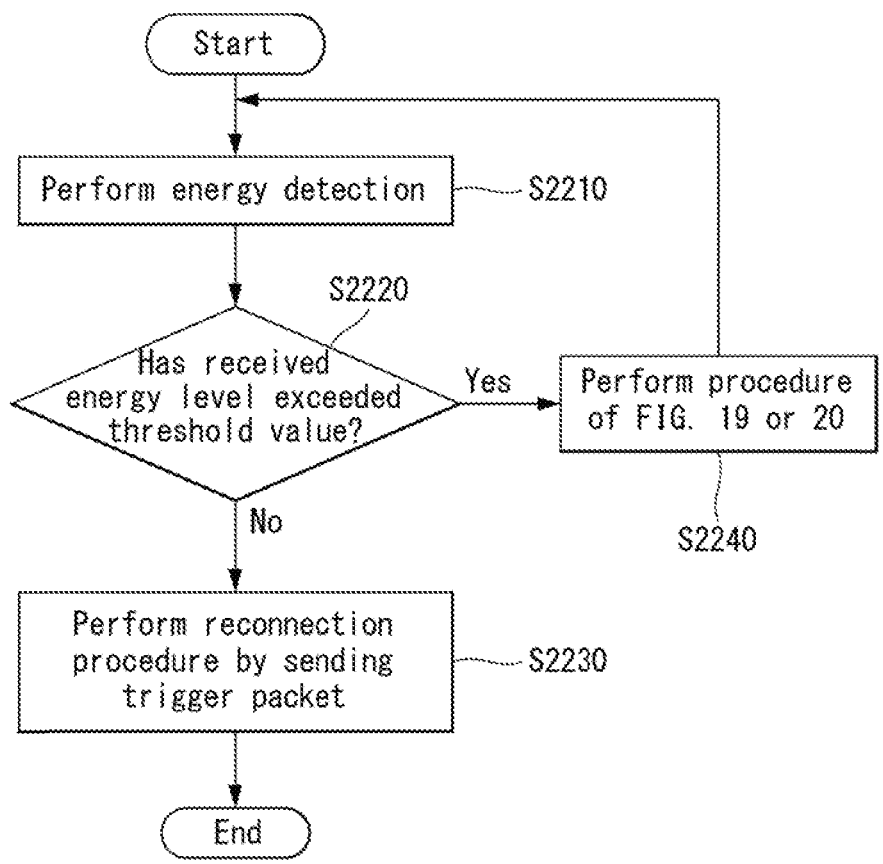
[FIG 22]

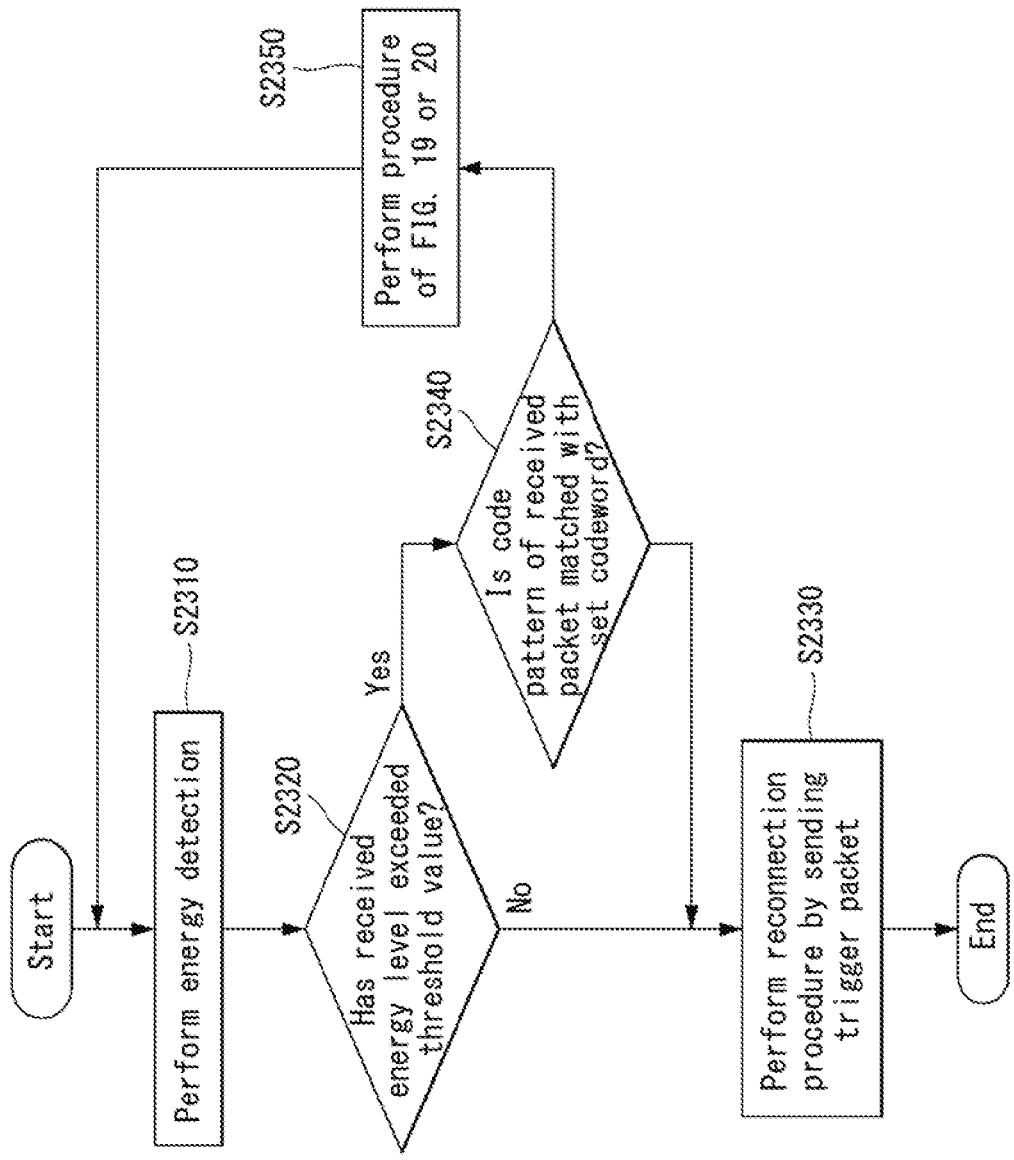
[FIG 23]

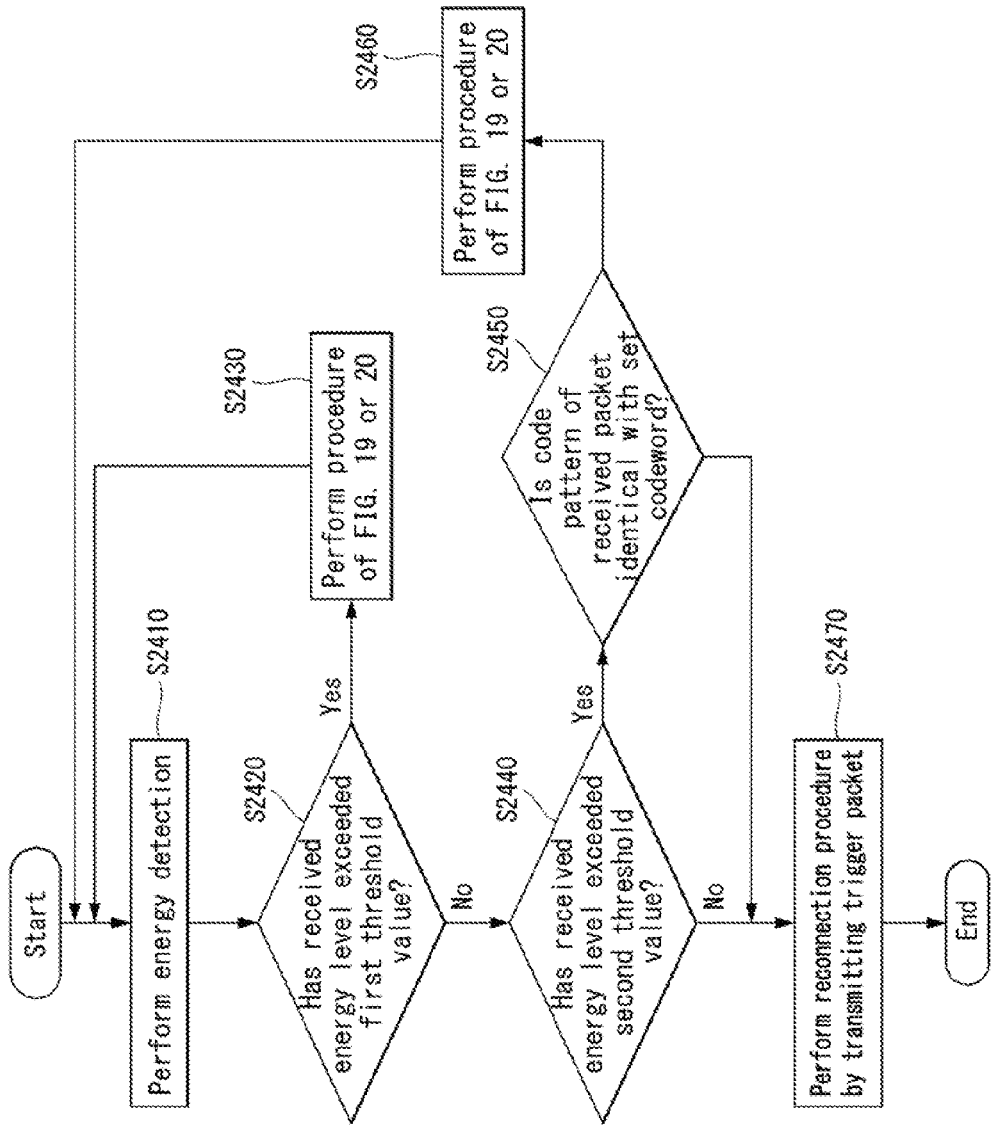
[FIG 24]

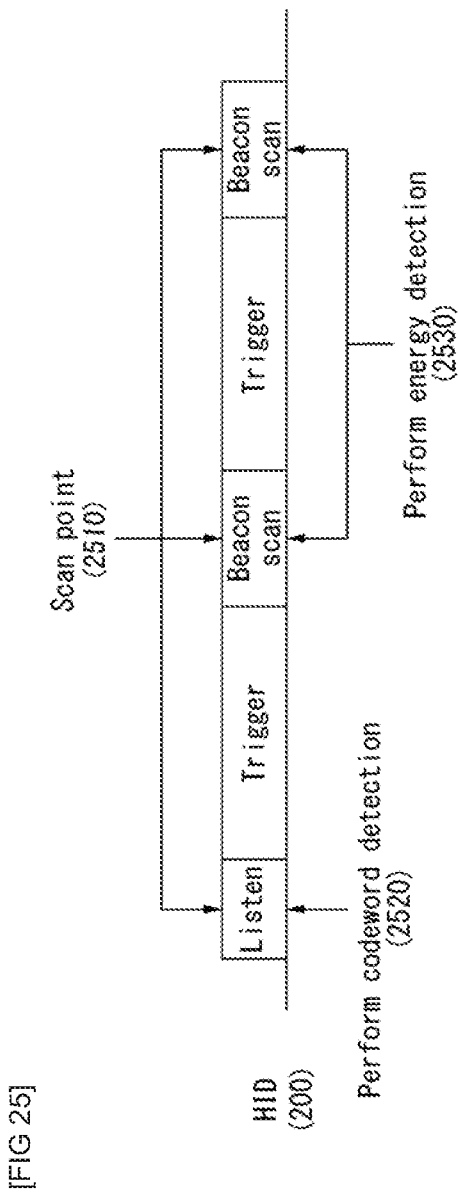

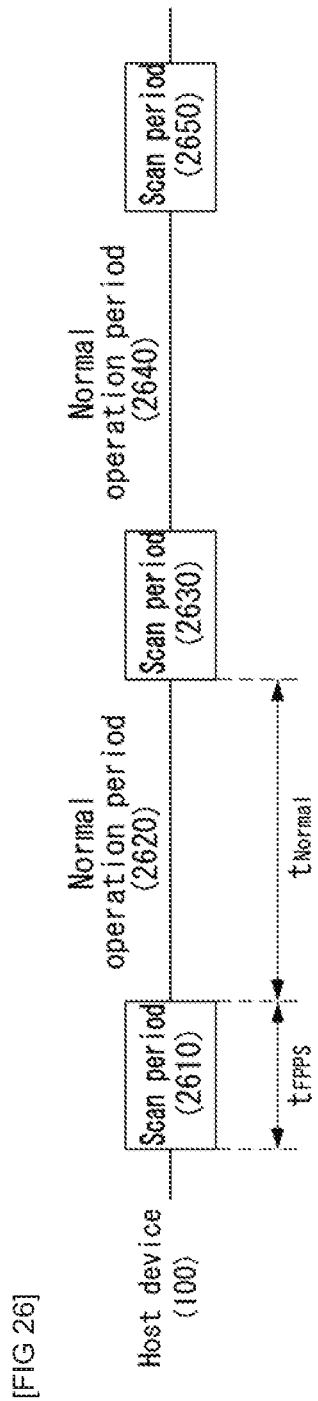

METHOD AND APPARATUS FOR BLUETOOTH CONNECTION

TECHNICAL FIELD

The present invention relates to a method and device for forming a connection between devices in a wireless communication system and, more particularly, to a method and device for reducing a reconnection time in a Bluetooth connection method.

BACKGROUND ART

Bluetooth is a short-distance radio technology standard in which a variety of types of devices are wirelessly connected at a short distance and data is exchanged. If wireless communication is to be performed between two devices using Bluetooth communication, a user performs a procedure for discovering Bluetooth devices to be communicated with each other and requesting connection between the Bluetooth devices. In embodiments of the present invention, a device may mean an apparatus or equipment.

In this case, a user may discover a Bluetooth device using a Bluetooth communication method to be used using a Bluetooth device and perform connection.

A Bluetooth communication method includes a Bluetooth Basic Rate/Enhanced Data Rate (BR/EDR) method and a Bluetooth Low Energy (LE) method, that is, a low power method. The Bluetooth BR/EDR method means a classic Bluetooth method. The classic Bluetooth method includes Bluetooth technologies from Bluetooth 1.0 to Bluetooth 2.1 using a basic rate and a Bluetooth technology which is supported from Bluetooth 2.0 and uses an enhanced data rate.

Bluetooth devices include products not having a display and/or a user interface. The complexity of connection/management/control/disconnection between a variety of types of Bluetooth devices and Bluetooth devices which belong to the variety of types of Bluetooth devices and to which similar technologies have been applied is increasing.

Alternatively, Bluetooth may have relatively high speed using relatively low energy and a low cost, but is suitable for being used in a limited space because it has a maximum transmission distance of 100 m.

DISCLOSURE

Technical Problem

An embodiment of the present invention provides a Bluetooth pairing method.

Furthermore, an embodiment of the present invention provides a Bluetooth pairing method between devices that had been initially paired.

Furthermore, an embodiment of the present invention provides a method for rapidly performing an initial pairing procedure for Bluetooth pairing between devices that had been initially paired.

Furthermore, an embodiment of the present invention provides a method for adding a semi-connected state in order to rapidly perform an initial pairing procedure for Bluetooth pairing between devices that had been initially paired.

Furthermore, an embodiment of the present invention provides a method capable of sending data in a semi-connected state.

Furthermore, an embodiment of the present invention provides a method for classifying a Human Input Device (HID) as a button device or a pointing device and variably setting a semi-connected state for each device.

Furthermore, an embodiment of the present invention provides a method for solving a collision generated when a plurality of HIDs performs connections again.

Furthermore, an embodiment of the present invention provides a method for configuring a scan point in order to solve a collision generated when a plurality of HIDs performs connections again.

Furthermore, an embodiment of the present invention provides a codeword detection method in order to solve intra-interference when a plurality of HIDs performs connections again.

Furthermore, an embodiment of the present invention provides a method using energy detection in order to solve inter-interference generated due to network communication other than Bluetooth when a reconnection is performed.

Furthermore, an embodiment of the present invention provides a method using both energy detection and codeword detection in order to solve intra-interference and inter-interference.

Furthermore, an embodiment of the present invention provides a method for applying energy detection and codeword detection to scan points differently.

Furthermore, an embodiment of the present invention provides a method capable of adaptively controlling the scan period and normal operation period of a master device by applying Fibonacci series.

Technical Solution

Embodiments of the present invention provide a Bluetooth reconnection method and device. More specifically, a Bluetooth reconnection method according to an embodiment of the present invention includes transmitting a first message notifying a second device of the activation of a first device to the second device through a specific channel, receiving a beacon message through the specific channel from the second device as a response to the first message, transmitting a request message requesting a connection with the second device using Bluetooth to the second device through the specific channel, and receiving a confirm message through the specific channel from the second device as a response to the request message. The first device stores information related to the Bluetooth connection with the second device.

Furthermore, according to an embodiment of the present invention, the information related to the Bluetooth connection with the second device may include at least one of the unique address (BD_ADDR) of a Bluetooth module assigned to the first device or a logical transport address (LT_ADDR) assigned to the first device.

Furthermore, according to an embodiment of the present invention, the first message may include sequentially sync words.

Furthermore, according to an embodiment of the present invention, the method may further include changing, by the first device, to a semi-connected state for the transmission of short data, when the confirm message is received.

Furthermore, according to an embodiment of the present invention, the specific channel may include any one of three channels assigned for the Bluetooth reconnection procedure.

Furthermore, according to an embodiment of the present invention, the request message may include device type information of the first device, and the device type includes any one of a button type and a pointing type.

Furthermore, according to an embodiment of the present invention, the confirm message may include at least one of a minimum data transmission number or a data transmission number.

Furthermore, according to an embodiment of the present invention, the data transmission number may be set to be half the minimum data transmission number when the first device is a button type, and the data transmission number may be set to be a value identical with the minimum data transmission number when the first device is a pointing type.

Furthermore, according to an embodiment of the present invention, the first device may increase the data transmission number by 1 when the first device sends data to the second device, and the first device may decrease the data transmission number by 1 when the first device does not send data to the second device.

Furthermore, according to an embodiment of the present invention, the first device may change to a connected state when the data transmission number is the minimum data transmission number or more.

Furthermore, an embodiment of the present invention provides a method, including determining whether a first trigger packet transmitted by another device is received through a specific channel, waiting until the first trigger packet transmitted by the second device is not received without transmitting a second trigger packet for the Bluetooth reconnection procedure to the second device when, as a result of the determination, the first trigger packet transmitted by the another device is received, and transmitting the second trigger packet to the second device through the specific channel when, as a result of the determination, the first trigger packet transmitted by the second device is not received. The method is performed in a listen period for a Bluetooth reconnection.

Furthermore, according to an embodiment of the present invention, the specific channel may include any one of three channels assigned for the Bluetooth reconnection procedure.

Furthermore, an embodiment of the present invention provides a method, including determining whether a first trigger packet transmitted by another device is received through a first channel, changing the first channel to a second channel without transmitting a second trigger packet for the Bluetooth reconnection procedure to the second device when, as a result of the determination, the first trigger packet transmitted by the second device is received, and sending a the second trigger packet to the second device through the second channel when the first trigger packet is not received through the changed second channel. The method is performed in a listen period for a Bluetooth reconnection.

Furthermore, according to an embodiment of the present invention, the first channel and the second channel may include any one of three channels assigned for the Bluetooth reconnection procedure.

Furthermore, an embodiment of the present invention provides a method, including measuring the energy level of a first signal transmitted by another device through a specific channel, comparing the energy level with a threshold value, waiting until the specific channel becomes idle when, as a result of the comparison, the energy level is greater than the threshold value, and transmitting a trigger packet for the Bluetooth reconnection procedure to the second device through the specific channel when the specific channel is idle. The method is performed in a listen period or beacon scan period for a Bluetooth reconnection, and the threshold value is a minimum value for distinguishing a Bluetooth signal from another network signal.

Furthermore, an embodiment of the present invention provides a method, including measuring the energy level of a first signal transmitted by another device through a specific channel, comparing the energy level with a threshold value, comparing the code pattern of the received signal with code words configured to find a collision when, as a result of the comparison, the energy level is greater than the threshold value, waiting until a reconnection procedure of the second device is terminated when, as a result of the comparison, the code pattern of the received signal is found to be matched with the code words, and transmitting a trigger packet for the Bluetooth reconnection procedure to the second device through the specific channel when the reconnection procedure of the another device is terminated. The method is performed in a listen period or beacon scan period for a Bluetooth reconnection, and the threshold value is a minimum value for checking a Bluetooth reconnection signal transmitted by the another device in the specific channel.

Furthermore, an embodiment of the present invention provides a device, including a communication unit configured to transmit and receive signals externally in wired and/or wireless manners and a control unit operatively connected to the communication unit. The control unit transmits a first message notifying a second device of the activation of the first device to the second device through a specific channel, receives a beacon message through the specific channel from the second device as a response to the first message, transmits a request message requesting a connection with the second device using Bluetooth to the second device through the specific channel, and receives a confirm message through the specific channel from the second device as a response to the request message. The first device stores information related to the Bluetooth connection with the second device.

Furthermore, according to an embodiment of the present invention, the information related to the Bluetooth connection with the second device may include at least one of the unique address (BD_ADDR) of a Bluetooth module assigned to the first device or a logical transport address (LT_ADDR) assigned to the first device.

Furthermore, according to an embodiment of the present invention, the first device may change to a semi-connected state for the transmission of short data, when the confirm message is received.

Furthermore, according to an embodiment of the present invention, the specific channel may include any one of three channels assigned for the Bluetooth reconnection procedure.

Advantageous Effects

In accordance with the Bluetooth connection method according to an embodiment of the present invention, a Bluetooth reconnection time can be reduced.

In accordance with the Bluetooth connection method according to an embodiment of the present invention, a Bluetooth reconnection time can be reduced because existing connection information is stored when a Bluetooth reconnection is performed.

In accordance with the Bluetooth connection method according to an embodiment of the present invention, short data can be transmitted prior to a connected state because a semi-connected state is set when a Bluetooth reconnection is performed.

In accordance with the Bluetooth connection method according to an embodiment of the present invention, a Bluetooth reconnection procedure can be efficiently performed by differently performing a reconnection procedure depending on the device type.

In accordance with the Bluetooth connection method according to an embodiment of the present invention, a collision can be solved when the collision is generated between devices in a Bluetooth reconnection procedure.

In accordance with the Bluetooth connection method according to an embodiment of the present invention, a collision can be solved by configuring a listen period when the collision is generated between devices in a Bluetooth reconnection procedure.

In accordance with the Bluetooth connection method according to an embodiment of the present invention, a collision can be solved because a device stays in a specific channel when the collision is generated between devices in a Bluetooth reconnection procedure.

In accordance with the Bluetooth connection method according to an embodiment of the present invention, a collision can be solved by changing a channel for a Bluetooth reconnection procedure when the collision is generated between devices in the Bluetooth reconnection procedure.

In accordance with the Bluetooth connection method according to an embodiment of the present invention, a collision can be solved through energy detection when the collision is generated between devices in a Bluetooth reconnection procedure.

In accordance with the Bluetooth connection method according to an embodiment of the present invention, a collision can be solved through codeword detection when the collision is generated between devices in a Bluetooth reconnection procedure.

DESCRIPTION OF DRAWINGS

FIG. 1 is a diagram showing an example of a Bluetooth network.

FIG. 2 is a diagram showing an example of an internal block of a device to which an embodiment of the present invention may be applied.

FIG. 3 is a diagram showing a protocol stack provided for Bluetooth communication to which an embodiment of the present invention may be applied.

FIG. 4 is a diagram showing a Bluetooth connection procedure.

FIG. 6 is a diagram showing an example of the trigger channels and time frames of a Bluetooth slave device to which an embodiment of the present invention may be applied.

FIGS. 7 and 8 are diagrams showing an example of the trigger scan procedure of a Bluetooth host device to which an embodiment of the present invention may be applied.

FIG. 9 is a diagram showing the time frame relationship between a Bluetooth host device and an HID to which an embodiment of the present invention may be applied.

FIG. 10 is a flowchart illustrating an example of a Bluetooth reconnection process to which an embodiment of the present invention may be applied.

FIGS. 11a and 11b are flowcharts illustrating an example of the state transition of an HID in a Bluetooth reconnection process to which an embodiment of the present invention may be applied.

FIG. 12 is a flowchart illustrating an example in which a state transition value is differently set depending on an HID to which an embodiment of the present invention may be applied.

FIG. 13 is a flowchart illustrating an example in which an HID switches from a semi-connected state to a connected state to which an embodiment of the present invention may be applied.

FIG. 14 is a flowchart illustrating an example in which an HID switches from a semi-connected state to a suspended state to which an embodiment of the present invention may be applied.

FIG. 15 is a flowchart illustrating another example in which an HID switches from a semi-connected state to a connected state to which an embodiment of the present invention may be applied.

FIGS. 16 to 17b are diagrams showing a collision which may be generated when a plurality of HIDs attempts reconnections in Bluetooth to which an embodiment of the present invention may be applied.

FIG. 18 is a diagram showing an example of a time frame for solving a collision when the collision is generated between a plurality of HIDs to which an embodiment of the present invention may be applied.

FIG. 20 is a flowchart illustrating another example in which a collision is solved when the collision is generated between a plurality of HIDs to which an embodiment of the present invention may be applied.

FIG. 21 is a flowchart illustrating an example of a time frame for solving a collision when the collision is generated in a Bluetooth reconnection procedure to which an embodiment of the present invention may be applied.

FIG. 22 is a flowchart illustrating an example in which inter-interference is solved when the inter-interference is generated.

FIG. 23 is a flowchart illustrating an example in which inter-interference is solved when the inter-interference is generated.

FIG. 24 is a flowchart illustrating an example in which interference is solved when the interference is generated.

FIG. 25 is a flowchart illustrating another example of a time frame for solving interference when the interference is generated.

FIG. 26 is a diagram showing an example in which the lengths of a scan period in which a Bluetooth connection is performed and a normal operation period are changed to which an embodiment of the present invention may be applied.

MODE FOR INVENTION

Figure 5:
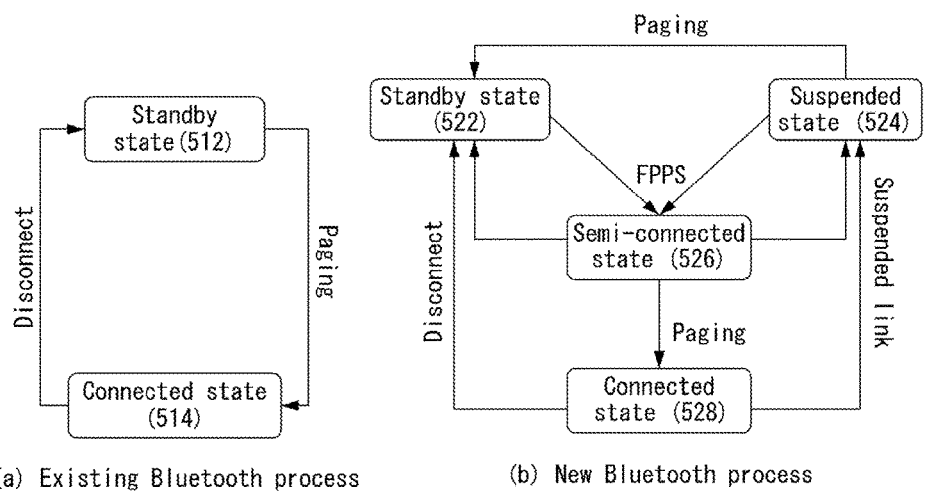
FIG. 5 is a diagram showing a Bluetooth process to which an embodiment of the present invention may be applied.

The above objects, characteristics, and merits of the present invention will become more apparent from the following detailed description taken in conjunction with the accompanying drawings. The present invention may be modified in various ways and may have some embodiments. Hereinafter, some exemplary embodiments of the present invention will be illustrated in the accompanying drawings and described in detail. The same reference numerals basically designate the same elements throughout the drawings. In describing the present invention, a detailed description of known functions or elements related to the present invention will be omitted if it is deemed to make the gist of the present invention unnecessarily vague.

Hereinafter, methods and devices related to the present invention are described in more detail with reference to the accompanying drawings. It is to be noted that the suffixes of the elements used in the following description, such as "module" and "unit", are assigned or interchangeable with each other by taking only the ease of writing this specification into consideration, but in themselves are not particularly given importance and roles.

An electronic device described in this specification may include a mobile phone, a smart phone, a notebook, a terminal for digital broadcast, a Personal Digital Assistant (PDA), a Portable Multimedia Player (PMP), a navigator, to a name few. However, those skilled in the art to which the present invention pertains may easily understand that the construction according to an embodiment described in this specification may also be applied to fixed terminals, such as digital TV and desktop computers, other than the case where the construction can be applied to only a mobile terminal.

A signal described in this specification may be transmitted in a frame form in addition to a message form.

FIG. 1 is a diagram showing an example of a Bluetooth network.

Referring to FIG. 1, Bluetooth may provide services through pairing with various electronic devices (100).

Bluetooth is a Radio Frequency (RF) specification proposed for the transmission of a short range, point to multipoint voice and data.

Bluetooth may perform transmission through a solid and nonmetallic material. The transmission range of Bluetooth is 10 cm to 10 m, but may be extended to 100 mm by increasing transmission power. Bluetooth is based on a radio link of a low cost and short range and facilitates an ad hoc connection in fixed and mobile communication environments.

Bluetooth uses a 2.45 GHz frequency, that is, an ISM band that is the same as that of the WLAN standards 802.11b/g. Bluetooth devices may perform wireless communication through processes, such as discovery/selection/pairing for surrounding Bluetooth devices.

Furthermore, Bluetooth may have relatively high speed using relatively low energy and a low cost, but is suitable for being used in a limited space because it has a maximum transmission distance of 100 m.

In Bluetooth 2.0 version, an Enhanced Data Rate (EDR) standard was added to guarantee a certain level of communication quality, thereby making Bluetooth popular rapidly. As the use of Bluetooth is generalized, the use of a portable terminal having the Bluetooth function is generalized. In particular, short-distance data communication using Bluetooth is generalized. For example, music can be heard wirelessly through Bluetooth communication with a Bluetooth headset.

Furthermore, Bluetooth becomes frequently used. For example, music is played back through a smart phone-vehicle speaker association using Bluetooth or through a Bluetooth docking speaker-smart phone association.

Furthermore, a Wireless Personal Area Network (WPAN) can maximize energy efficiency because a small amount of data can be transmitted between devices in environments, such as a home network, a small office, and a vehicular network.

Furthermore, the WPAN provides a real-time A/V Streaming service through an electronic device, such as a headset, in a limited bandwidth and is widely used because it can maximize energy efficiency even when a dependent remote control function is performed.

Furthermore, recently, Human Input Device (hereinafter referred to as an "HID") products, such as a mouse and a keyboard adopting Bluetooth BR/EDR, are greatly increased. An HID 200 may be basically divided into two types: a mouse 200-2 and a keyboard 200-1.

The mouse 200-2 and the keyboard 200-1 may not have a special on/off button. The HID 200 that is not used for several hours changes its Bluetooth module to a sleep state in order to prevent an energy loss. However, there is a disadvantage in that Bluetooth needs to pair the HID with host device 100, such as a PC or a laptop computer, again when a user uses the HID 200 again. Furthermore, the frequent pairing of the HID 200 results in frequent delay and greatly deteriorates user convenience.

Accordingly, an embodiment of the present invention proposes a method and device for reducing delay when a Bluetooth HID is connected to a host device again.

FIG. 2 is a diagram showing an example of an internal block of a device to which an embodiment of the present invention may be applied.

The host device 100 and the HID 200 may refer to all of electronic devices capable of supporting a Bluetooth function.

The HID 200 may directly communicate with another device, may receive data, and may notify another device of the results of processing of the received data.

Furthermore, the HID 200 may receive a request for data from another device and send the requested data to another device. To this end, the HID 200 may send a notification or indication message to another device and receive a confirm message for the notification or indication message.

The host device 100 refers to all devices capable of receiving a connection request from the HID 200 or another device and sending and receiving data through a Bluetooth connection.

The host device 100 and the HID 200 may include communication units 110 and 210, user input units 120 and 220, output units 130 and 230, control units 140 and 240, memory 150 and 250, and power supplies 160 and 260, respectively.

The communication units 110 and 210, the user input units 120 and 220, the output units 130 and 230, the control units 140 and 240, the memory 150 and 250, and the power supplies 160 and 260 are operatively connected in order to perform methods proposed according to embodiments of the present invention.

The elements of FIG. 2 are not essential, and a device having a large number or smaller number of elements than the elements of FIG. 2 may be implemented.

The communication unit 110 and 210 may include one or more modules that enable wireless communication between a device and a wireless communication system or between a device and a network in which the device is placed. For example, the communication unit 110 and 210 may include a broadcast reception module (not shown), a mobile communication module (not shown), a wireless Internet module (not shown), and a short-distance communication module (not shown).

The communication unit 110 and 210 may also be called a transmission/reception unit.

The mobile communication module exchanges radio signals with at least one of a base station, an external terminal or a server over a mobile communication network. The radio signal may include a variety of types of data according to the transmission and reception of voice call signals, video telephony call signals, or text/multimedia messages.

The wireless Internet module refers to a module for wireless Internet access. The wireless Internet module may be internal or external to a device. A Wireless LAN (WLAN) (Wi-Fi), a Wireless Broadband (WiBro), a World Interoperability for Microwave Access (WiMax), and High Speed Downlink Packet Access (HSPDA) may be used as the wireless Internet technology.

The device may perform a Wi-Fi Peer to Peer (P2P) connection to another device through the wireless Internet module. A streaming service may be provided between devices through such a Wi-Fi P2P connection. The device may send and receive data or may be connected to a printer and provide a printing service through the Wi-Fi P2P connection.

The short-distance communication module (not shown) is connected to an adjacent device through short-distance communication. Bluetooth, Zigbee and/or Near Field Communication (NFC) may be used as a short-distance communication technology.

The user input unit 120 and 220 generates input data for controlling the operations of the device by a user. The user input unit 220 may include a key pad dome switch, a touch pad (resistive/capacitive), a jog wheel and/or a jog switch.

In an embodiment of the present invention, the user input units 110 and 220 of the HID 200 may be divided into a type in which a user input is received in a button form and a type in which a user input is received using a pointing form.

The output unit 130 and 230 generates output related to visual, auditory, or tactile senses and may include a display module 132 and 232 and a sound output module 134 and 234.

The display module 132 and 232 displays information processed by the device. For example, if the device is call mode, the display module displays a User Interface (UI) or Graphic User Interface (GUI) related to a call. If the device is video telephony mode or photographing mode, the display module displays a photographed or/and received image, a UI, or a GUI.

The display module 132 and 232 may include at least one of a liquid crystal display, a thin film transistor liquid crystal display, an organic light-emitting diode, a flexible display, and a 3D display.

The sound output module 134 and 234 may output audio data received from the communication unit 130 and 230 or stored in the memory 150 and 250 in incoming call mode, communication mode, recording mode, voice recognition mode, and broadcast reception mode. The sound output module 134 and 234 outputs sound signals related to a function (e.g., a received call sound and a received message sound) performed in the device. The sound output module 134 and 234 may include a receiver, a speaker, and a buzzer.

The control unit 140 and 240 refers to a module for controlling an overall operation of the host device 100 or HID 200 and may perform control so that a request to transmit a message or the processing of a received message is performed through a Bluetooth interface and another communication interface.

The control unit 140 and 240 may be called a controller, a microcontroller, or a microprocessor and may be implemented by hardware, firmware, software or a combination of them.

The control unit 140 and 240 may include Application-Specific Integrated Circuits (ASICs), other chipsets, logic circuits and/or data processing devices.

The memory 150 and 250 is a medium for storing a variety of types of information of the device. The memory 150 and 250 is connected to the control unit 140 and 240 and may store programs, applications, common files, and input/output data for the operations of the control unit 140 and 240.

The memory 150 and 250 may include at least of a flash memory type, a hard disk type, a multimedia card micro type, card type memory (e.g., SD or XD memory), Random Access Memory (RAM), Static Random Access Memory (SRAM), Read-Only memory (ROM), Electrically Erasable Programmable Read-Only Memory (EEPROM), Programmable Read-Only Memory (PROM), magnetic memory, a magnetic disk and an optical disk. The device may also operate in relation to web storage that performs the storage function of the memory 240 on the Internet.

The power supply 160 and 260 refers to a module for being supplied with external power or internal power and supplying power for the operations of the elements under the control of the control unit 140 and 240.

FIG. 3 is a diagram showing a protocol stack provided for Bluetooth communication to which an embodiment of the present invention may be applied.

FIG. 3(a) is a diagram showing the structure of the BR/EDR protocol stack according to a Bluetooth BR/EDR method, and FIG. 3(b) is a diagram showing the structure of an LE protocol stack according to the Bluetooth LE method.

More specifically, the Bluetooth protocol stack may include host protocols 320 and 420 on the upper side of respective Host Controller Interfaces (HCI) 318 and 416 and controller protocols 310 and 410 on the upper side of the respective HCIs 318 and 416.

The controllers 310 and 410 correspond to Bluetooth modules. The hosts 320 and 420 are connected to the Bluetooth modules, that is, the controllers 310 and 410, control the Bluetooth modules, and perform operations. A PC, a PDA, or a smart phone may become a host, and a processor included in a system may become a host according to circumstances.

In an embodiment of the present invention, the Bluetooth module may include a Bluetooth LE module and a Bluetooth BR/EDR module.

(a) The BR/EDR protocol stack may include a BR/EDR profile 324, a Generic Access Profile (GAP) 323, a BR/EDR protocol 322, a logical link control and adaptation protocol (L2CAP) 321, and a link manager (LL) 316, a link controller (LL) 314, and a physical layer (PHY) 312 included in the controller 310.

(b) The LE protocol stack may include an LE profile 426, a Generic Access Profile (GAP) 425, a GATT profile (GATT) 424, an ATT protocol (ATT) 423, a Security Manager (SM) 422, a logical link control and adaptation protocol (L2CAP) 421, and a link layer (LL) 414 and a physical layer (PHY) 412 which are included in the controller 410. The LE protocol stack is different from the BR/EDR protocol stack.

The controllers 310 and 410 and the hosts 320 and 420 are connected by the HCIs 318 and 416, respectively.

The hosts 320 and 420 may provide commands and data to the controllers 310 and 410 through the HCIs 318 and 416. The controllers 310 and 410 may provide events and data to the hosts 320 and 420 through the HCIs 318 and 416.

The PHY layer 412 of (b) the LE protocol stack is a lay for sending and receiving radio signal and may include Gaussian Frequency Shift Keying (GFSK) modulation and 40 Radio Frequency (RF) channels.

The link layer 414 may generate connection between devices by performing advertising and scanning functions using three advertising channels and provide a function for exchanging data packets through 37 data channels.

The host 420 may multiplex various protocols and profiles provided by higher Bluetooth using the logical link control and adaptation protocol (hereinafter referred to as "L2CAP") 421.

The L2CAP 421 may provide a single bi-directional channel for sending data to a specific protocol or profile and uses three fixed channels in the Bluetooth LE method.

The three fixed channels may be used for a signaling channel, the security manager 422, and the ATT protocol (hereinafter referred to as "ATT") 423, respectively.

In a Bluetooth Basic Rate/Enhanced Data Rate (BR/EDR), a dynamic channel is used, and a protocol service multiplexer, retransmission, and streaming mode may be supported.

The security manager (hereinafter referred to as "SM") 422 is a protocol for providing device pairing and a key distribution.

The ATT 423 is used for communication between a server and a client and has an attribute handle that enables a client to access attributes included in a server. Protocol operation commands include "Request", "Response", "Command", "Notification", "Indication", and "Confirm."

Request and Response messages: a Request message is a message for allowing a client device to request specific information from a server device. A Response message is a response message for a Request message and refers to a message transmitted from a server device to a client device.

Command message: a Command message is a message transmitted from a client device to a server device in order to indicate a command of a specific operation. A server device does not send a response to a Command message to a client device.

Notification message: a Notification message is a message transmitted from a server device to a client device for a notification, such as an event. A client device does not send a Confirm message for a Notification message to a server device.

Indication and Confirm messages: Indication and Confirm messages are messages transmitted from a server device to a client device for a notification, such as an event. Unlike in a Notification message, a client device sends a Confirm message for an Indication message to a server device.

The GATT profile (hereinafter referred to as "GATT") 424 is a layer newly implemented for a Bluetooth LE technology, and it defines a procedure for obtaining corresponding information using the S/W elements of a Bluetooth device below and messages defined in the ATT protocol. The procedure may define the configuration of discovering, reading, writing, notifying, and indicating characteristics.

Service: define the basic operation of a device through a combination of behaviors related to data.

Include: define the relationship between services.

Characteristics: data values used in a service.

Behavior: a computer-readable format defined as a Universally Unique Identifier (UUID).

The GAP 425 defines a scheme for discovering and connecting defined devices and providing information to a user and may provide privacy.

The LE profile 426 includes profiles dependent on the GATT 424 and is chiefly applied to a low energy device.

Embodiments of the present invention propose methods and devices for a new network, for example, an efficient Wi-Fi P2P connection by sending information for Wi-Fi P2P pairing using the (a) BR/EDR protocol stack or (b) LE protocol stack of Bluetooth, which has low power consumption and a relatively fast pairing procedure.

FIG. 4 is a diagram showing a Bluetooth connection procedure.

In a Bluetooth pairing procedure, the state is divided into a standby state and a connected state only. Paired devices become the connected state, and a device whose connection is terminated operates in the standby state.

A Bluetooth device is connected to a specific device through a connection process S410. Thereafter, although the Bluetooth device performs a reconnection process S420 in order to connect to the specific device again, it attempts the connection through the same procedure as the previous connection process S410.

More specifically, when being powered on, the HID 200 may basically enter the standby state and may become an inquiry state in order to discover a surrounding connectable device. The host device 100 may become an inquiry scan state in order to receive an ID packet transmitted by a surrounding device in the inquiry state.

The HID 200 in the inquiry state sends an inquiry message using an ID packet once or at a specific time interval in order to discover a surrounding connectable device (S412).

The ID packet may be General Inquiry Access Code (GIAC) or Dedicated Inquiry Access Code (DIAC).

After receiving GIAC or DIAC, that is, the ID packet transmitted by the HID 200, the host device 100 may send a Frequency Hopping Sequence (FHS) in order to perform Bluetooth pairing with the HID 200. For example, if there is data to be transmitted, the host device 100 may send an Extended Inquiry Response (hereinafter referred to as an "EIR").

When a surrounding connectable Bluetooth device is discovered through the inquiry procedure, the HID 200 may perform a paging procedure. The paging procedure refers to a step for synchronizing a hopping sequence using an address or clock information and performing an actual connection, after a surrounding connectable Bluetooth device is discovered through the inquiry procedure.

When the inquiry procedure and the paging procedure are completed (S412), the host device 100 and the HID 200 performs a security establishment step S414 and a Logical Link Control and Adaption Protocol (L2CAP) connection and service discovery step S416.

The L2CAP is a protocol of a packet type and has characteristics similar to those of an UDP protocol. The packet size of the L2CAP is basically a maximum of 672 bytes, but may be changed up to a maximum of 65,535 bytes when communication starts.

After performing the L2CAP connection and service discovery step S416, the HID 200 may send data, received from a user, to the host device 100 (S418).

After performing the connection process S410, if there is no change of data between the host device 100 and the HID 200 for a specific time, the host device 100 and the HID 200 change their Bluetooth modules to a sleep state in order to prevent energy consumption. Accordingly, the connected state of the host device 100 and the HID 200 is terminated.

Thereafter, in order to send and receive data again, the host device 100 and the HID 200 need to perform the reconnection process S420. The reconnection process S420 may be performed according to the same procedure as the connection process S410.

If a reconnection process is frequently generated, however, delay may be generated. If the same process as the first connection process is performed in order to be connected to the same device, efficiency is deteriorated and user convenience is also reduced. Accordingly, a method capable of such problems is described below.

FIG. 5 is a diagram showing a Bluetooth process to which an embodiment of the present invention may be applied.

Referring to FIG. 5(a), an existing Bluetooth BR/EDR process does not have a procedure according to a reconnection. All of devices may have a connected state 514 through paging and a standby state 512 attributable to connection termination.

If the state is divided into the connected state 514 and the standby state 512 as described above, a device that is not used for a specific time enters the standby state 512. Thereafter, the device may have a long access time taken to enter the connected state 514 through new paging when the device is used again.

Referring to FIG. 5(b), in a Bluetooth process proposed according to an embodiment of the present invention, only a device attempting an initial Bluetooth connection stays in a standby state 522, and a device that was once connected may enter a suspended state 524 not the standby state 522.

Unlike in the standby state 522, in the suspended state 524, the entire access history, including the unique address (hereinafter referred to as a "BD_ADDR") of a host and a logical transport address LT_ADDR assigned to a specific device, is stored. When the specific device performs a reconnection, it may become a semi-connected state 526 for fast pairing and then become a connected state 528 if the specific device needs to continue to be used.

The semi-connected state 526 may indicate a middle step between the standby state 522 and the connected state 528 and indicate a temporary state in which short event data is rapidly delivered.

A procedure for switching from the suspended state 524 to the semi-connected state 526 or from the standby state 522 to the semi-connected state 526 is hereinafter referred to as a Fast Pre-Paging Scheme (FPPS).

A Bluetooth device may have basic information for connecting to a device that was connected once through the FPPS and may be rapidly reconnected to the device that was connected once based on the basic information.

FIG. 6 is a diagram showing an example of the trigger channels and time frames of a Bluetooth slave device to which an embodiment of the present invention may be applied.

If the HID 200 had been connected the host device 100, the HID 200 may become the semi-connected state 526 through the FPPS procedure.

More specifically, if the HID 200 that had been connected to the host device 100 is not used for a specific time, the HID 200 may switch to the suspended state 524 of FIG. 5, may store only its own access information, and may stop Bluetooth communication so as to reduce power consumption.

Thereafter, when the HID 200 is activated again in response to a user input, it sends a trigger packet to the host device 100 through a specific Radio Frequency (RF) channel in order to notify the host device 100 of its reactivation state.

The specific RF channel refers to a channel that is least influenced by another network communication, such as Wi-Fi. Such a specific channel is referred to as a trigger channel. For example, three channels are described below.

(a) The HID 200 may repeatedly configure time frames through which the HID 200 can notify the host device 100 of its activation state in three trigger channels n, n+1, and n+2 and may perform a procedure for a reconnection with the host device 100 through the configured time frames.

(b) In the time frame, the HID 200 may periodically configure a period in which a trigger packet for notifying the host device 100 of its activation state is transmitted and a beacon scan period in which the HID 200 receives a beacon transmitted by the host device 100 that has received the trigger packet.

The trigger packet may include continuous sync words. The host device 100 may be aware of the activation state of the HID 200 by detecting the sync word of a received trigger packet.

The sync word is indicative of a signal of a specific pattern and may not include data. The reason for this is that it is unaware that the host device 100 will receive a trigger packet from what portion of the trigger packet.

After receiving the sync word, the host device 100 sends a beacon packet as a response to the sync word. The HID 200 that has received the beacon packet may stop an operation in the suspended state 524 and switch to the semi-connected state 526 of FIG. 5.

FIGS. 7 and 8 are diagrams showing an example of the trigger scan procedure of a Bluetooth host device to which an embodiment of the present invention may be applied.

The host device 100 may periodically perform scan in order to discover the HID 200 that had been connected to the host device 100.

More specifically, the host device 100 may periodically configure scan periods 710, 730, and 750 in order to receive a trigger packet transmitted by the HID 200 that had been connected thereto.

The scan periods 710, 730, and 750 may be performed on the three trigger channels described with reference to FIG. 6. The time taken to stay in each of the channels may include a paging scan period in which the trigger packet is received and a sleep period.

The paging scan period may be configured in each trigger channel. The sleep period may be configured so as to reduce power consumption of the host device 100. Furthermore, the sleep period may be configured to apply the time during which a frequency configuration to a next trigger channel is completed.

That is, the host device 100 may discover the HID 200 that will attempt a reconnection in the three trigger channels through the scan periods 710, 730, and 750.

Time intervals between the scan periods 710, 730, and 750 may be closely related to the time when the HID 200 is discovered. Accordingly, the scan periods 710, 730, and 750 may be configured by incorporating the characteristics of a target system into the scan periods 710, 730, and 750.

When a sync word forming the trigger packet is received through the periodical scan periods 710, 730, and 750, the host device 100 may send a beacon in order to be connected to the HID 200.

In normal operation periods 720 and 740, any reception is not performed in the three trigger channels assigned for a reconnection because frequency hopping in Bluetooth is performed.

After receiving the beacon, the HID 200 may switch to the semi-connected state 526 or the connected state 528. If the HID 200 switches to the connected state 528, it may perform direct communication based on frequency hopping according to the Bluetooth BR/EDR method through the normal operation periods 720 and 740 of the host device 100.

FIG. 8 shows a trigger scan procedure of the host device 100 different from that of FIG. 7.

Unlike in the embodiment of FIG. 7, in the embodiment of FIG. 8, the three trigger channels for receiving a trigger packet transmitted by the HID 200 can be continuously scanned without a sleep period.

As described above, the time for the scan periods 810, 830, and 850 of the trigger channels can be reduced through such a continuous scan.

The periodical scan periods 710, 730, and 750 of FIG. 7 may cause overhead in a Bluetooth BR/EDR operation unless a reconnection request is generated by the HID 200. If the interval between the periodical scan periods is set to be short, the entire performance of Bluetooth BR/EDR may be reduced. Accordingly, the embodiment in which the scan periods 810, 830, and 850 are reduced in FIG. 8 can improve performance because overhead of Bluetooth BR/EDR is reduced.

FIG. 9 is a diagram showing the time frame relationship between a Bluetooth host device and an HID to which an embodiment of the present invention may be applied.

FIG. 9 shows a process with the host device 100, wherein the HID 200 described with reference to FIGS. 7 and 8 switches to the semi-connected state 526.

More specifically, if the HID 200 that had been connected to the host device 100 has not been used for a specific time and has switched to the suspended state 524, when input from a user is generated, the HID 200 continuously sends a trigger packet in a channel "n" in order to become the semi-connected state 526 (S910).

However, the host device 100 is in a normal operation period and thus is unable to enter a periodical scan period. Accordingly, the host device 100 is unable to receive the trigger packet in the channel "n" and also unable to send a beacon packet.

Since the host device 100 does not send a beacon packet, the HID 200 is unable to receive a beacon packet, that is, a response from the host device 100, in a beacon scan period (S912).

The HID 200 changes its channel within predetermined three trigger channels because the beacon packet is not received and may send a trigger packet to the host device 100 again in a channel "n+1" (S914).

After entering the periodical scan period, the host device 100 may change the channel "n" to the channel "n+1" because the trigger packet has not been received in the channel "n" and may receive the trigger packet from the HID 200 in the channel "n+1."

The host device 100 that has received the trigger packet may send a beacon packet to the HID 200. The HID may receive the beacon packet from the host device 100 through the beacon scan period (S916).

Thereafter, the HID 200 may send a connection request message that requests a reconnection to the host device 100 in the channel "n+1" (S918).

In response to the connection request message, the host device 100 may send a connection confirm message to the HID 200 if the reconnection of the HID 200 is approved (S920). The HID 200 that has received the connection confirm message may switch to the semi-connected state 526.

In the semi-connected state 526, simple data may be exchanged. Accordingly, the HID 200 may send data, received from the user, to the host device 100 (S922). The host device 100 may send a poll message to the HID 200 (S924).

Thereafter, if there is data to be transmitted to the host device 100, the HID 200 may send the data to the host device 100 as a response to the poll message.

FIG. 10 is a flowchart illustrating an example of a Bluetooth reconnection process to which an embodiment of the present invention may be applied.

Referring to FIG. 10, when the HID 200 that had been connected to the host device 100 receives input from a user, it may perform a reconnection with the host device 100 in order to send the input.

More specifically, if the HID 200 that had been connected to the host device 100 through Bluetooth and is not used for a specific time, it switches to the suspended state (S1010).

In order to receive a trigger packet transmitted by a surrounding HID for a connection, the host device 100 periodically becomes a trigger scan state (S1020). When a trigger packet transmitted by a surrounding HID is received in the trigger scan state, the host device 100 may perform a procedure for a reconnection.

When the HID 200 in the suspended state receives input from a user, it may send a trigger packet to the host device 100 in a trigger channel "n" for a reconnection with the host device 100. In this case, when the host device 100 is in the trigger scan state in the trigger channel "n", it may receive the trigger packet (S1030).

The trigger packet does not include any data because it includes only sync words as described with reference to FIG. 6.

The host device 100 that has received the trigger packet may send a beacon packet for the reconnection to the HID 200 as a response to the trigger packet (S1040). Parameters which may be included in the beacon packet are shown in Table 1 below.

TABLE 1

| FRAME | PARAMETER |
|---|---|
| Beacon | BD_ADDR |
|  | CLK |
|  | LT_ADDR |

The beacon packet may include clock information in order to notify the HID 200 of the hopping sequence of the host device 100. The beacon packet may include LT_ADDR, that is, the address of a logical transport for fast access, and BD_ADDR, that is, the unique address of a Bluetooth module.

The HID 200 that has received the beacon may send a connection request message that requests a connection to the host device 100 in order to switch to the semi-connected state (S1050).

Parameters which may be included in the connection request message are shown in Table 2 below.

TABLE 2

| FRAME | PARAMETER |
|---|---|
| Connection_Request | BD_ADDR |
|  | Resume |
|  | EDR_allowed |
|  | 3-slot_packets_allowed |
|  | 5-slot_packets_allowed |
|  | Role_switch_requested |
|  | Dev_type |

The parameter "EDR_allowed" indicates that which one of the Bluetooth BR method and the Bluetooth EDR method was used in a previous connection and may indicate that Bluetooth communication using which method will be used when a reconnection is performed. For example, the parameter "EDR_allowed" may include that the Bluetooth EDR method was used in a previous connection, and the parameter "BR_allowed" may indicate that the Bluetooth BR method was used in a previous connection. The parameter "Resume" may indicate that a connection request is a reconnection request.

The parameter "3-slot_packets_allowed" and the parameter "5-slot_packets_allowed" are information indicating that the HID 200 in the semi-connected state has switched to the connected state after it sent how many data packets.

The parameter "Role_switch_request" may indicate that the HID 200 requests the host device 100 that it operates as a slave device not a master device. That is, if the HID 200 attempts the first connection in Bluetooth BR/EDR, it operates as a master device and then plays the role of a slave device through a role switch.

In a reconnection procedure, however, such a process is an unnecessary process. Accordingly, the HID 200 may send the parameter "Role_switch_request" in order to omit such a process.

The parameter "Dev_type" may include information indicating that the HID 200 is which type of a device, for example, a keyboard of a button input type or a mouse of a point input device.

In response to the connection request message, the host device 100 may send a connection confirm message to the HID 200 (S1060). Parameters which may be included in the connection confirm message are shown in Table 3 below.

TABLE 3

| FRAME | PARAMETER |
| --- | --- |
| Connection_Confirm | BD_ADDR |
|  | Resume |
|  | EDR_allowed |
|  | Active_Mode_Instant |
|  | Mode_Counter |

The parameter "EDR_allowed" may include information indicating whether a Bluetooth reconnection is allowed.

The parameter "Active_Mode_Instant" may indicate a minimum data transmission number at which the HID 200 becomes the connected state. The parameter "Mode_Counter" may be set by the host device 100 and may indicate a state value which is varied depending on whether the HID 200 sends data.

The value of the parameter "Active_Mode_Instant" is initially set by the host device 100 and is not changed in the same semi-connected state.

The HID 200 that has received the connection confirm message may switch to the semi-connected state (S1070) and send data, received from the user, to the host device 100 (S1080).

Thereafter, the host device 100 may send a poll message to the HID 200 (S1090). If the HID 200 has data to be transmitted, it may send the data to the host device 100 as a response to the poll message.

FIGS. 11a and 11b are flowcharts illustrating an example of the state transition of an HID in a Bluetooth reconnection process to which an embodiment of the present invention may be applied.

From FIGS. 11a and 11b, it may be seen that an HID that had been connected to a host device changes its state depending on whether there is a user input and whether it has continuously sent data when the HID performs a reconnection with the host device.

More specifically, the HID 200 that had been connected to the host device 100 may switch to the suspended state if it is not used for a specific time.

Thereafter, the HID 200 may continue to determine whether there is a user input (S1102). If, as a result of the determination, it is determined that a user input is present, the HID 200 may perform a procedure for switching to the semi-connected state.

S1104 to S1110 of FIG. 112 are the same as S1030 to S1070 of FIG. 10, and thus a description thereof is omitted.

When receiving a connection confirm message from the host device 100, the HID 200 switches to the semi-connected state. In this case, the host device 100 may set the values of the parameters "Active_Mode_Instant" and "Mode_Counter" of FIG. 10 in the HID 200 through the connection confirm message.

The HID 200 that has switched to the semi-connected state may receive a poll message from the host device 100 (S1112). If the HID 200 has data to be transmitted, it may send the data to the host device 100 as a response to the poll message.

The HID 200 may change the value of the parameter "Mode_Counter" depending on whether it sends data (S1114). That is, if the HID 200 sends data, the value of the parameter "Mode_Counter" is increased by 1 (S1118). If the HID 200 does not send data, the value of the parameter "Mode_Counter" is decreased by 1 (S1116).

The HID 200 whose parameter "Mode_Counter" has been changed may compare the value of the parameter "Mode_Counter" with the value of the parameter "Active_Mode_Instant" (S1120).

If, as a result of the comparison, the value of the parameter "Mode_Counter" is found to be the parameter "Active_Mode_Instant" value or more and thus continuous data is determined to have been generated, the HID 200 may switch to the connected state based on clock information included in the beacon packet transmitted by the host device 100 (S1122). After switching to the connected state, the HID 200 may send the data according to a Bluetooth frequency hopping method.

If, as a result of the comparison at step S1120, the value of the parameter "Mode_Counter" is found to be less than the parameter "Active_Mode_Instant" value, however, the HID 200 may compare the value of the parameter "Mode_Counter" with 0 (S1124).

If, as a result of the comparison at step S1124, the value of the parameter "Mode_Counter" is found to be 0 or less, the HID 200 may determine that it has not been used for a specific time because there is no data transmission and may switch to the suspended state (S1126).

If, as a result of the comparison at step S1124, the value of the parameter "Mode_Counter" is found to be greater than 0, the HID 200 receives a poll message from the host device 100 again and repeatedly performs S1114 to S1124.

Since the semi-connected state is a temporary and transient state, data transmission may be delayed due to frequency hopping and the data processing capacity may be limited if the semi-connected state continues.

Accordingly, if the number of times that data is generated from the HID 200 attempting a reconnection is large, the transmission/reception of data may be induced by a frequency hopping procedure through a common operation of Bluetooth. If the number of times that data is generated from the HID 200 attempting a reconnection is small, the time when the HID stays in the semi-connected state may be reduced through the transfer of short data in the semi-connected state.

FIG. 12 is a flowchart illustrating an example in which a state transition value is differently set depending on an HID to which an embodiment of the present invention may be applied.

Referring to FIG. 12, the value of the parameter "Mode_Counter" may be differently set depending on the type of HID 200, and a reconnection procedure may be performed.

More specifically, the HID 200 may be classified as a pointing device (e.g., a mouse) or a button device (e.g., a keyboard), and the parameter "Mode_Counter" may be differently set.

For example, the button device may send and receive a small amount of data in the semi-connected state and switch to the suspended state because input data is not continuous and the size of information is small and may be intermittently generated.

In contrast, the pointing device may continuously generate data while it is used, and the amount of data is great compared with the button device. Accordingly, the transmission/reception of data by the pointing device is minimized in the semi-connected state, and the point device may switch to the connected state.

The parameter "Mode_Counter" may be differently set depending on a device type due to the characteristics of each device.

When the host device 100 receives a connection request message from the HID 200 through the procedure of FIG. 9 or 10, it may determine whether the HID 200 is a button type or a pointing type based on a device type included in the connection request message (S1210).

Table 4 below shows an example of device type information "Dev_Type" included in the connection request message.

TABLE 4

| Dev_Type (1 bit) | Definition |
| --- | --- |
| 0 | Button type |
| 1 | Pointing type |

Referring to Table 4, if the value of Dev_Type is 1, the host device 100 may be aware that the HID 200 is a device of a pointing type (e.g., a mouse) and may set the value of the parameter "Mode_Counter" so that it has the same value as the parameter "Active_Mode_Instant."

If the value of Dev_Type is 0, the host device 100 may be aware that the HID 200 is a device of a button type (e.g., a keyboard) and may set the value of the parameter "Mode_Counter" so that it has a value half the value of the parameter "Active_Mode_Instant."

The host device 100 may include the set values of the parameters "Mode_Counter" and "Active_Mode_Instant" in a connection confirm message and send the connection confirm message to the HID 200. The HID 200 may set the values of the parameters "Mode_Counter" and "Active_Mode_Instant" based on the connection confirm message.

FIG. 13 is a flowchart illustrating an example in which an HID switches from the semi-connected state to the connected state to which an embodiment of the present invention may be applied.

Referring to FIG. 13, the HID 200 of a button type may switch from the semi-connected state to the connected state by continuously sending data.

S1310 to S1322 of FIG. 13 are the same as S1030 to S1090 of FIG. 10, and thus a description thereof is omitted.

More specifically, if the HID 200 in the semi-connected state is a button type, the value of the parameter "Mode_Counter" may be set to be half the value of the parameter "Active_Mode_Instant" according to the procedure of FIG. 12.

For example, if the value of the parameter "Active_Mode_Instant" is 6, the value of the parameter "Mode_Counter" may be set to 3. Thereafter, if the HID 200 has data to be transmitted to the host device 100, it may send the data to the host device 100 as a response to the poll message (S1324) and may change the value of the parameter "Mode_Counter" to 4 by increasing the value by 1.

The HID 200 whose parameter "Mode_Counter" has changed to 4 may receive a poll message from the host device 100 again (S1326). If the HID 200 has data to be transmitted, it may continue to send the data to the host device 100 (S1328).

After sending the data, the HID 200 may change the value of the parameter "Mode_Counter" to 5 by increasing the value by 1. Furthermore, the HID 200 may change the value of the parameter "Mode_Counter" to 6 through the reception of a poll message (S1330) and the transmission of data (S1332). Thereafter, when the HID 200 receives a poll message (S1334), since the value of the parameter "Mode_Counter" is equal to or greater than the value of the parameter "Active_Mode_Instant", the HID 200 is no longer in the semi-connected state and may switch to the connected state and send data (S1336).

Furthermore, in order to exit from the trigger channel and to perform a data transmission/reception operation through the frequency hopping of the Bluetooth BR/EDR method, the host device 100 changes the trigger channel (S1338). The HID 200 that has switched to the connected state may synchronize the frequency hopping sequence of the host device 100 based on clock information included in the beacon packet received from the host device 100 and may send and receive data using the Bluetooth BR/EDR method.

FIG. 14 is a flowchart illustrating an example in which an HID switches from the semi-connected state to the suspended state to which an embodiment of the present invention may be applied.

Referring to FIG. 14, if the HID 200 that has switched to the semi-connected state does not send data for a specific time, it may become the suspended state again in order to reduce energy consumption.

S1410 to S1424 of FIG. 14 are the same as S1030 to S1090 of FIG. 10, and thus a description thereof is omitted.

More specifically, if the HID 200 in the semi-connected state is a button type, the value of the parameter "Mode_Counter" may be set to be half the value of the parameter "Active_Mode_Instant" according to the procedure of FIG. 12.

For example, if the value of the parameter "Active_Mode_Instant" is 6, the value of the parameter "Mode_Counter" may be set to 3.

If the HID 200 does not have data to be transmitted to the host device 100, the HID 200 is unable to respond to a poll message from the host device 100 and may reduce the value of the parameter "Mode_Counter" by 1 and change the value of the parameter "Mode_Counter" to 2.

The host device 100 may send a poll message to the HID 200 again (S1426). If the HID 200 does not have data to be transmitted to the host device 100, it may reduce the value of the parameter "Mode_Counter" by 1 and change the value of the parameter "Mode_Counter" to 1.

Thereafter, if the HID 200 continues to not have data to be transmitted to the host device 100, it is unable to send data to the host device 100 as a response to a poll message. The HID 200 may continue to reduce the value of the parameter "Mode_Counter" by 1 (S1428, S1430).

If the value of the parameter "Mode_Counter" becomes 0 or less because there is no data to be transmitted to the host device 100, the HID 200 may switch from the semi-connected state to the suspended state (S1432). The host device 100 may exit from the trigger channel in order to perform a Bluetooth operation through frequency hopping and change a channel (S1434).

FIG. 15 is a flowchart illustrating another example in which an HID switches from the semi-connected state to the connected state to which an embodiment of the present invention may be applied.

Referring to FIG. 15, if the HID 200 is a pointing device, it may rapidly switch from the semi-connected state to the connected state because the amount of input data may be large and the number of times that the input data is generated may be continuous.

S1510 to S1522 of FIG. 15 are the same as S1030 to S1090 of FIG. 10, and thus a description thereof is omitted.

More specifically, if the HID 200 in the semi-connected state is a pointing type, the value of the parameter "Mode_Counter" may be set to be the same as that of the parameter "Active_Mode_Instant" according to the procedure of FIG. 12.

For example, if the value of the parameter "Active_Mode_Instant" is 3, the value of the parameter "Mode_Counter" may be set to 3.

Thereafter, since the value of the parameter "Mode_Counter" is identical with or greater than the parameter "Active_Mode_Instant", the HID 200 is no longer present in the semi-connected state and may switch to the connected state and send data (S1524).

Furthermore, in order to exit from the trigger channel and to perform a data transmission/reception operation through the frequency hopping of the Bluetooth BR/EDR method, the host device 100 changes a channel (S1526). The HID 200 that has switched to the connected state may synchronize the frequency hopping sequence of the host device 100 based on clock information included in the beacon packet received from the host device 100 and send and receive data using the Bluetooth BR/EDR method.

As described above, if the HID 200 is a pointing type, there is a good possibility that data may continue to be received from a user. In this case, the time in the semi-connected state can be reduced, and efficiency of data transmission/reception can be reduced.

FIGS. 16 to 17*b* are diagrams showing a collision which may be generated when a plurality of HIDs attempts reconnections in Bluetooth to which an embodiment of the present invention may be applied.

Referring to FIG. 16, while the host device 100 sends and receives data to and from the HIDs 200-1 and 200-2 through Bluetooth connections, when the host device 100 temporarily disables the Bluetooth function, the Bluetooth connections of the HIDs 200-1 and 200-2 are terminated.

Thereafter, if the HIDs 200-1 and 200-2 attempts reconnections, the HIDs 200-1 and 200-2 may not succeed in the reconnections for a long time although the Bluetooth function of the host device 100 is enabled.

A collision which may be generated when the HIDs 200-1 and 200-2 attempt reconnections is described with reference to FIGS. 17*a* and 17*b*. Referring to FIG. 17*a*, if the beacon scan periods of the HID 1 200-1 and the HID 2 200-2 do not overlap, that is, if the HID 2 200-2 sends a trigger packet while the HID 1 200-1 sends a trigger packet, the host device 100 continues to receive the trigger packets from the HID 1 200-1 and the HID 2 200-2. Accordingly, although the host device 100 sends a beacon, a collision between the beacon and the trigger packet may be generated.

Furthermore, referring to FIG. 17*b*, if the beacon scan periods of the HID 1 200-1 and the HID 2 200-2 overlap because the HID 1 200-1 and the HID 2 200-2 attempt reconnections with the host device 100 at the same time, the host device 100 is unable to determine that it will send a beacon to which device because the trigger packets of the HID 1 200-1 and the HID 2 200-2 are mixed and received.

A method for solving such a collision is described below.

FIG. 18 is a diagram showing an example of a time frame for solving a collision when the collision is generated between a plurality of HIDs to which an embodiment of the present invention may be applied.

Referring to FIG. 18, in order to solve the problems described with reference to FIGS. 16 to 18, the HID 200 may place a listen period 1810 before sending a trigger packet for a reconnection and determine whether another HID sends a trigger packet for a reconnection.

An operation in the listen period is described in detail below.

Figure 19:
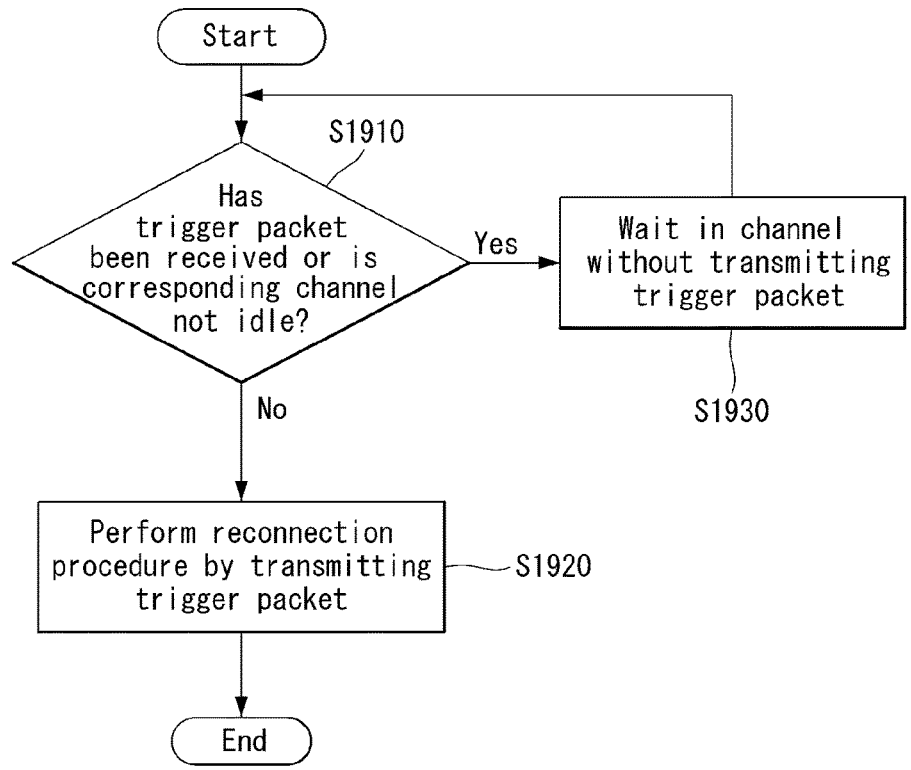
FIG. 19 is a flowchart illustrating an example in which a collision is solved when the collision is generated between a plurality of HIDs to which an embodiment of the present invention may be applied.

FIG. 19 is a flowchart illustrating an example in which a collision is solved when the collision is generated between a plurality of HIDs to which an embodiment of the present invention may be applied.

For a reconnection with the host device 100, the HID 200 that had been connected to the host device 100 may configure a listen period for preventing a collision with another HID in a reconnection procedure before sending a trigger packet.

Referring to FIG. 19, in the listen period, the HID 200 may receive a trigger packet transmitted from another HID to the host device 100 (S1910).

If the HID 200 does not receive the trigger packet of another HID in the listen period or a corresponding channel is idle, the HID 200 may perform the reconnection procedure described with reference to FIG. 9 or 10 by sending a trigger packet to the host device 100 (S1920).

If the HID 200 has received the trigger packet of another HID in the listen period or the corresponding channel is not idle (e.g., if there is a collision with another network connection other than Bluetooth), the HID 200 may determine that another HID performs a procedure for a reconnection or that communication using another network is performed and may wait in the channel without sending the trigger packet to the host device 100 (S1930).

Through such a listen period, the HID 200 can reduce a collision with another HID in a reconnection process.

FIG. 20 is a flowchart illustrating another example in which a collision is solved when the collision is generated between a plurality of HIDs to which an embodiment of the present invention may be applied.

FIG. 20 shows an operation in a listen period for preventing a collision with another HID in the procedure of FIG. 19. When a collision is generated, the collision can be avoided by changing a trigger channel.

More specifically, in the listen period, the HID 200 may receive a trigger packet transmitted from another HID to the host device 100 (S2010).

If the HID 200 does not receive the trigger packet of another HID in the listen period, the HID 200 may perform the reconnection procedure described with reference to FIG. 9 or 10 by sending a trigger packet to the host device 100 (S2020).

If the HID 200 has received the trigger packet of another HID in the listen period or a corresponding channel is not idle (e.g., if there is a collision with another network connection other than Bluetooth), the HID 200 determines that another HID performs a procedure for a reconnection or that communication using another network is performed.

In this case, the HID 200 may determine whether there is a trigger channel that belongs to the three trigger channels described with reference to FIG. 6 and that may be moved (S2030). That is, the HID 200 may determine whether there is a trigger channel at which a reconnection procedure is not attempted (S2030).

If, as a result of the determination, it is determined that a movable trigger channel is present, the HID 200 may change the current channel to the movable trigger channel without sending the trigger packet in the current channel (S2050) and perform S2010 again in the listen period.

If, as a result of the determination, it is determined that a movable trigger channel is not present, the HID 200 may perform the procedure described with reference to FIG. 19, thereby being capable of avoiding a collision (S2040).

Through the procedures described with reference to FIGS. 19 and 20, the HID 200 can avoid a collision and perform a reconnection procedure. The procedures of FIGS. 19 and 20 may be performed in the beacon scan period in addition to the listen period.

FIG. 21 is a flowchart illustrating an example of a time frame for solving a collision when the collision is generated in a Bluetooth reconnection procedure to which an embodiment of the present invention may be applied.

FIGS. 16 to 20 have illustrated the procedures performed to prevent a collision between HIDs for a Bluetooth reconnection. If the HID 200 does not successfully receive a beacon packet due to interference, a collision may be generated due to another network (e.g., Wi-Fi) using the same band in addition to other Bluetooth HIDs.

Accordingly, in order to solve such an interference problem, when interference is generated, a scan point 2110 at which the interference can be found may be configured, and the interference can be prevented through an interference solving procedure.

More specifically, the interference may be divided into two types. Hereinafter, interference generated by another network using the same frequency band, such as Wi-Fi, is referred to as "inter-interference." Interference generated in a reconnection procedure using the FPPS procedure described with reference to FIGS. 16, 17*a*, and 17*b* is referred to as "intra-interference."

In order to solve the inter-interference or the intra-interference, the HID 200 may configure the scan point 2110 in the listen period or the beacon scan period.

A detailed method for solving the interference is described below.

FIG. 22 is a flowchart illustrating an example in which inter-interference is solved when the inter-interference is generated.

Referring to FIG. 22, the HID 200 may determine whether inter-interference with another network, such as Wi-Fi using the same frequency band, has been generated through energy detection and perform a procedure for solving the inter-interference.

More specifically, the HID 200 may configure a scan point in the listen period or the scan period, as described with reference to FIG. 22.

At the scan point, the HID 200 may measure the energy level of a signal received by the communication unit of the HID 200 by performing energy detection (S2210).

The energy detection is for measuring power of the signal received by the HID 200. In this case, energy may mean power of the received signal. The energy detection may be performed in order to determine whether the received signal generates interference between the HID 200 and the host device 100 in Bluetooth communication.

The HID 200 may compare the measured energy level with a threshold value set in the HID 200 (S2220). If, as a result of the comparison, the energy level is found to be the threshold value or less, the HID 200 may determine that the received signal does not generate interference and perform the reconnection procedure described with reference to FIG. 9 or 10 by sending a trigger packet (S2230).

If, as a result of the comparison, the energy level is found to exceed the threshold value, the HID 200 may determine that inter-interference with another network using the same band has been generated and may wait in the channel or perform a procedure for changing the channel as described with reference to FIG. 19 or 20, thereby being capable of avoiding the inter-interference (S2240).

In this case, in the procedure of FIG. 19, the HID 200 may wait without sending a trigger packet in the channel until the channel becomes idle because interference with another network using the same band has been generated.

The threshold value is used to distinguish a Bluetooth signal from the signal of another network. The Bluetooth signal may be distinguished from the signal of another network based on the threshold value because the Bluetooth signal has smaller transmission power than the signal of another network (e.g., Wi-Fi).

The procedure of FIG. 22 does not require complicated operation, such as correlation, and has low energy consumption because a comparison is performed on only the intensities of measured signals without performing a demodulation procedure.

FIG. 23 is a flowchart illustrating an example in which inter-interference is solved when the inter-interference is generated.

Referring to FIG. 23, the HID 200 may determine whether intra-interference with another HID using Bluetooth communication has been determined through codeword detection and perform a procedure for solving the intra-interference.

More specifically, the HID 200 may configure a scan point in the listen period or the scan period, as described with reference to FIG. 22.

At the scan point, the HID 200 may measure the energy level of a signal received by the communication unit of the HID 200 by performing an energy detection procedure (S2310). That is, the HID 200 may measure power of the received signal in order to determine whether the received signal generates interference in Bluetooth communication between the HID 200 and the host device 100.

The HID 200 may compare the measured energy level with a threshold value set in the HID 200 (S2320). If, as a result of the comparison, the energy level is found to be the threshold value or less, the HID 200 may perform the reconnection procedure described with reference to FIG. 9 or 10 by sending a trigger packet (S2330).

If, as a result of the comparison, the energy level is found to exceed the threshold value, the HID 200 may determine that intra-interference with another HID attempting a Bluetooth reconnection procedure has been generated and perform codeword detection (S2340).

The threshold value is a value set to determine whether another HID sends a trigger packet so as to perform a reconnection procedure along with the host device 100.

The HID 200 may compare the code pattern of the received signal with code words set in the HID 200 through the codeword detection (S2340).

If, as a result of the comparison, the code pattern of the received packet is matched with the set code words, the HID 200 may determine that the intra-interference has occurred and may wait in the channel or perform a procedure for changing the channel as described with reference to FIG. 19 or 20 (S2350).

In this case, in the procedure of FIG. 19, the HID 200 may wait in a trigger channel until the reconnection procedure of another HID is terminated because interference with another HID has been generated.

For the codeword detection, a demodulation procedure may be performed in order to check a code pattern. Accordingly, the codeword detection has high energy consumption compared with the energy detection of FIG. 22, but has a simple demodulation procedure because codeword is the overlap of common patterns and has low energy consumption compared with the reception of common data.

The embodiment of FIG. 23 may be used when interference is generated because the HID 200 and another HID attempt a reconnection procedure at the same host device, which has been described with reference to FIGS. 16 to 17b.

FIG. 24 is a flowchart illustrating an example in which interference is solved when the interference is generated.

Referring to FIG. 24, both energy detection and codeword detection may be used to solve the inter-interference and the intra-interference described with reference to FIG. 22.

More specifically, the HID 200 may configure a scan point in the listen period or the scan period in order to find interference, as described with reference to FIG. 22.

At the scan point, the HID 200 may measure the energy level of a signal received by the communication unit of the HID 200 by performing energy detection for measuring power of the received signal in order to determine whether interference has been generated (S2410).

The HID 200 may compare the measured energy level with a first threshold value set in the HID 200 (S2420). If, as a result of the comparison, the measured energy level is found to exceed the first threshold value, the HID 200 may determine that inter-interference with another network using the same band has been generated and may wait in a channel or perform a procedure for changing a channel, that is, the process for avoiding interference, described with reference to FIG. 19 or 20, as in FIG. 23, thereby being capable of avoiding the inter-interference (S2430).

In this case, in the procedure of FIG. 19, the HID 200 may wait without sending a trigger packet in the channel until the channel becomes idle because interference with another network using the same band has been generated.

The first threshold value is a value for distinguishing a Bluetooth signal from the signal of another network. The Bluetooth signal may be distinguished from the signal of another network based on the first threshold value because the Bluetooth signal has smaller transmission power than the signal of another network (e.g., Wi-Fi).

If, as a result of the comparison at step S2420, the measured energy level is found to be the first threshold value or less, the HID 200 may determine that the inter-interference has not been generated, may set a second threshold value lower than the first threshold value, and may compare the second threshold value with the measured energy level (S2240).

If, as a result of the comparison at step S2240, the measured energy level is found to be the second threshold value or less, the HID 200 may perform the reconnection procedure described with reference to FIG. 9 or 10 by sending a trigger packet (S2470).

If, as a result of the comparison at step S2240, the measured energy level is found to exceed the second threshold value, the HID 200 may determine that intra-interference with another HID attempting a Bluetooth reconnection procedure and perform codeword detection (S2450).

The second threshold value is a value set to determine whether another HID sends a trigger packet in order to perform a reconnection procedure along with the host device 100.

The HID 200 may compare the code pattern of the received signal with code words set in the HID 200 through the codeword detection (S2450).

If, as a result of the comparison at step S2450, the code pattern of the received packet is found to be matched with the set code words, the HID 200 may determine that the intra-interference has been generated and may wait in a channel or perform a procedure for changing a channel, that is, the procedure for avoiding interference, as described with reference to FIG. 19 or 20 (S2460).

In this case, in the procedure of FIG. 19, the HID 200 may wait in a trigger channel until the reconnection procedure of another HID is terminated because interference with another HID has been generated.

In the procedure, the first threshold value and the second threshold value may be different set, and the energy detection and the codeword detection may be sequentially performed.

Accordingly, the inter-interference can be distinguished from the intra-interference, and there is an advantage in that both the inter-interference and the intra-interference can be solved by performing procedures for solving interference according to different methods.

FIG. 25 is a flowchart illustrating another example of a time frame for solving interference when the interference is generated.

Referring to FIG. 25, the HID 200 may configure a scan point 2510 for finding and solving interference in a listen period or a beacon scan period. Interference may be solved by performing the codeword detection and the energy detection described with reference to FIGS. 23 and 24 at different scan points 2510.

More specifically, the HID 200 which performs a procedure for a Bluetooth reconnection may have a listen period before it sends a trigger packet and may perform the codeword detection procedure of FIG. 23 in the listen period (2520).

The other HID may perform a reconnection procedure after the reconnection procedure of one HID is terminated. Accordingly, if the codeword detection procedure is performed in the listen period, the generation of the intra-interference can be fundamentally prevented.

Thereafter, if the HID 200 performs the energy detection procedure 2530 of FIG. 22 in the beacon scan period, inter-interference can be solved when it is generated.

FIG. 26 is a diagram showing an example in which the lengths of a scan period in which a Bluetooth connection is performed and a normal operation period are changed to which an embodiment of the present invention may be applied.

Referring to FIG. 26, the length of a scan period for a Bluetooth reconnection and the length of a normal operation period for Bluetooth BR/EDR operations may be differently set for each cycle.

More specifically, the scan periods 2610, 2630, and 2650 of the host device 100 are periods performed only in the host device. If the lengths of the scan periods 2610, 2630, and 2650 are set to be great, the reconnection time of the HID 200 is reduced. However, performance in Bluetooth BR/EDR operations may be deteriorated because the normal operation periods 2620 and 2640 of the host device 100 are reduced.

If the lengths of the scan periods 2610, 2630, and 2650 are set to be small, however, performance in Bluetooth BR/EDR operations becomes better, but the reconnection time of the HID 200 may be increased.

Accordingly, in order to solve such problems, a ratio of a scan period and a normal operation period may be flexibly set depending on whether a reconnection procedure is successful. The scan period and the normal operation period may be determined by Equation 1 below. Hereinafter, the scan period is indicated by $t_{FPPS}$, and the normal operation period is indicated by $t_{Nomal}$.

$$t_{FPPS,1}=1, t_{FPPS,2}=1$$

$$t_{FPPS,n}=t_{FPPS,n-1}+t_{FPPS,n-2}(t_{FPPS,n}<t_{FPPS,MAX})$$

$$t_{Nomal,1}=t_{MAX}-t_{FPPS,1}=T_{MAX}-1$$

$$t_{Nomal}=t_{MAX}-t_{FPPS,n} \quad \text{[Equation 1]}$$

Referring to Equation 1, after the initial value of $t_{FPPS}$ is set to 1, the value of an n-th $t_{FPPS}$ is defined as $t_{FPPS,n}$. If a reconnection procedure through the FPPS is not completed within a single scan period, the scan period is increased by increasing the value "n."

As the value "n" is increased, the scan period is set to be further great. In this case, Fibonacci series may be applied. Fibonacci series refers to the arrangement of numbers in which the sum of previous two numbers becomes a subsequent number. For example, Fibonacci series refers to a series of 1, 1, 2, 3, 5, 8, 13, 21, 34 . . . .

In this case, a maximum value of the scan period may be limited to a value of $t_{max}-1$ because the scan period may not exceed the size of a maximum duty cycle that has been initially defined.

The problem in that performance in Bluetooth communication is deteriorated as the length of the scan period is increased can be solved by differently setting the scan period and the normal operation period for each cycle through such a process.

The present invention may be substituted, modified, and changed in various ways by those skilled in the art to which the present invention pertains without departing from the technical spirit of the present invention and thus is not limited to the aforementioned embodiments and the accompanying drawings.

INDUSTRIAL APPLICABILITY

The embodiments of the present invention provide a method and device for a network connection between devices in a wireless communication system. In particular, the embodiments of the present invention provide a method and device for reducing a Bluetooth reconnection time and preventing a collision between devices in Bluetooth, that is, a short-distance wireless communication technology.

The invention claimed is:

1. A method for performing a reconnection procedure in a wireless communication system, the method performed by a first device comprising:

transmitting a first trigger packet notifying a second device of an activation of the first device to the second device on a first channel in a suspended state,
      wherein the first trigger packet is constructed by repeating a plurality of sync words,
      wherein the suspended state indicates a state in which a connection is suspended after the first device has made the connection with the second device for first time in a standby state,
      wherein the connection is suspended when no data is exchanged for a preset period of time between the first device and the second device after the connection is established between the first device and the second device,
      wherein the first device stores a plurality of parameters for reconnecting with the second device in the suspended state, and
      wherein the plurality of parameters stored in the first device are deleted when the first device is disconnected from the second device and transitioned from the suspended state to the standby state
   entering a semi-connected state in response to a beacon message that is received from the second device in response to the first trigger packet,
      wherein the beacon message includes clock information indicating a frequency hopping sequence of the second device, and
      wherein the semi-connected state indicates a temporary state for transmitting and receiving user traffic before the first device enters a connected state;
   transmitting a request message requesting a reconnection with the second device to the second device in the semi-connected state,
   wherein the request message includes number information indicating a number of times of transmission/reception of data for the first device to transition from the semi-connected state to the connected state; and
   receiving a confirm message from the second device in response to the request message.

2. The method of claim 1, wherein the plurality of parameters includes at least one of a unique address (BD_ADDR) of a Bluetooth module assigned to the first device or a logical transport address (LT_ADDR) assigned to the first device.

3. The method of claim 1, wherein the first channel is included in three channels assigned for the reconnection procedure.

4. The method of claim 1,
   wherein the request message further includes device type information of the first device, and
   wherein a device type indicated by the device type information comprises any one of a button type and a pointing type.

5. The method of claim 1, wherein the confirm message includes at least one of a minimum data transmission number or a data transmission number.

6. The method of claim 5, wherein the first device transitions to the connected state when the data transmission number is equal to or greater than the minimum data transmission number.

7. A first device in a method for performing a reconnection procedure in a wireless communication system, the first device comprising:

a communication unit configured to transmit and receive signals externally in at least one of a wired manner or a wireless manner; and a controller operatively connected to the communication unit and configured to:
cause the communication unit to transmit a first trigger packet notifying a second device of an activation of the first device to the second device on a first channel in a suspended state,
wherein the first trigger packet is constructed by repeating a plurality of sync words,
wherein the suspended state indicates a state in which a connection is suspended after the first device has made the connection with the second device for first time in a standby state,
wherein the connection is suspended when no data is exchanged for a preset period of time between the first device and the second device after the connection is established between the first device and the second device,
wherein the first device stores a plurality of parameters for reconnecting with the second device in the suspended state, and
wherein the plurality of parameters stored in the first device are deleted when the first device is disconnected from the second device and transitioned from the suspended state to the standby state;
enter a semi-connected state in response to a beacon message that is received from the second device in response to the first trigger packet,
wherein the beacon message includes clock information indicating a frequency hopping sequence of the second device, and
wherein the semi-connected state indicates a temporary state for transmitting and receiving user traffic before the first device enters a connected state;
cause the communication unit to transmit a request message requesting a reconnection with the second device to the second device in the semi-connected state,
wherein the request message includes number information indicating a number of times of transmission/reception of data for the first device to transition from the semi-connected state to the connected state; and
cause the communication unit to receive a confirm message from the second device in response to the request message.

8. The method of claim 1, wherein entering the second state comprises:
entering the second state when the first device receives the beacon message in response to the first trigger packet on the first channel.

9. The method of claim 1, further comprising:
transmitting a second trigger packet on a second channel when the first device fails to receive the beacon message in response to the first trigger packet on the first channel,
wherein the second channel is included in three channels assigned for the reconnection procedure.

10. The method of claim 1, further comprising:
synchronizing a frequency hopping sequence with the second device based on the clock information.

11. The method of claim 1, wherein the standby state indicates a state in which the connection has been terminated between the first device and the second device or a state in which the first device attempts an initial connection with the second device.

12. The method of claim 11, wherein the first device that has been previously connected with the second device enters the suspended state with respect to the second device when the connection has not been used for the preset period of time.

* * * * *